(12) United States Patent
Umemura et al.

(10) Patent No.: US 11,276,887 B2
(45) Date of Patent: Mar. 15, 2022

(54) POWER SUPPLIER

(71) Applicant: MAKITA CORPORATION, Anjo (JP)

(72) Inventors: Takuya Umemura, Anjo (JP); Takayoshi Endo, Anjo (JP); Hironori Kandori, Anjo (JP)

(73) Assignee: MAKITA CORPORATION, Anjo (JP)

(*) Notice: Subject to any disclaimer, the term of this patent is extended or adjusted under 35 U.S.C. 154(b) by 87 days.

(21) Appl. No.: 16/591,801

(22) Filed: Oct. 3, 2019

(65) Prior Publication Data

US 2020/0119409 A1    Apr. 16, 2020

(30) Foreign Application Priority Data

Oct. 12, 2018    (JP) .............................. JP2018-193583

(51) Int. Cl.
*H02J 7/00* (2006.01)
*H01M 10/42* (2006.01)

(52) U.S. Cl.
CPC ......... *H01M 10/425* (2013.01); *H02J 7/0042* (2013.01); *H02J 7/0063* (2013.01); *H01M 2010/4271* (2013.01)

(58) Field of Classification Search
USPC ........................................................ 320/126
See application file for complete search history.

(56) References Cited

U.S. PATENT DOCUMENTS

| | | | |
|---|---|---|---|
| 2004/0121223 A1* | 6/2004 | Kim ...................... | H01M 10/44 429/61 |
| 2013/0025893 A1 | 1/2013 | Ota et al. | |
| 2021/0211083 A1* | 7/2021 | Jore ........................ | B60L 50/75 |

FOREIGN PATENT DOCUMENTS

JP    2011-218510 A    11/2011

* cited by examiner

*Primary Examiner* — Bryce M Aisaka
(74) *Attorney, Agent, or Firm* — Oliff PLC

(57) ABSTRACT

A power supplier in one aspect of the present disclosure includes an outputter, a first pack parallel coupler, a second pack parallel coupler, an output voltage switch, and a controller. Each of the first pack parallel coupler and the second pack parallel coupler includes pack couplers. The pack couplers are configured to be coupled by battery packs. The output voltage switch is configured to switch an electrical coupling state between the second pack parallel coupler and the outputter. The controller is configured to determine an output mode of the outputter. The output mode corresponds to a magnitude of voltage to be outputted from outputter. The controller is configured to control the output voltage switch based on a result of determination.

28 Claims, 14 Drawing Sheets

POWER SUPPLIER

CROSS-REFERENCE TO RELATED APPLICATIONS

This application claims the benefit of Japanese Patent Application No. 2018-193583 filed on Oct. 12, 2018 with the Japan Patent Office, the entire disclosure of which is incorporated herein by reference.

BACKGROUND

The present disclosure relates to a power supplier.

Japanese Unexamined Patent Application Publication No. 2011-218510 discloses a power supplier (battery unit) that uses batteries to supply electric power to an external electric device.

The power supplier can form a power supply system together with an external device connector. The external device connector is configured to be attached to/detached from an outputter of the power supplier, and is coupled to the external electric device.

The power supplier includes a switcher provided with switches in order to change an output voltage to the external electric device (FIGS. 4, 11, and so on of the aforementioned Japanese Unexamined Patent Application Publication No. 2011-218510). This switcher can change the output voltage of the power supplier by controlling the switches to change a coupling state of the batteries to parallel coupling or serial coupling. This allows power supply to various types of power suppliers at an appropriate voltage.

In addition, the switcher can be configured to control the switches to discharge the batteries at the same time, or to discharge only some of the batteries.

SUMMARY

The aforementioned power supplier is provided with many switches in the switcher. Therefore, a circuit configuration of the power supplier may become complicated and costs of the power supplier may increase.

It is desirable that a power supplier in one aspect of the present disclosure can achieve power supply using batteries in a simplified circuit configuration and reduce costs.

A power supplier in one aspect of the present disclosure includes an outputter, a first pack parallel coupler, a second pack parallel coupler, an output voltage switch, and/or a controller.

The outputter at least includes a ground output terminal, a first positive electrode output terminal, and a second positive electrode output terminal.

The first pack parallel coupler includes pack couplers. Each of the pack couplers is configured to be coupled to a corresponding one of battery packs. Each of the battery packs includes a positive electrode terminal and a negative electrode terminal. The first pack parallel coupler is configured to couple the battery packs coupled to the pack couplers in parallel. The first pack parallel coupler is configured to couple the positive electrode terminal of each of the battery packs to the first positive electrode output terminal, and configured to couple the negative electrode terminal of each of the battery packs to the ground output terminal.

The second pack parallel coupler includes pack couplers. Each of the pack couplers is configured to be coupled to a corresponding one of battery packs. Each of the battery packs includes a positive electrode terminal and a negative electrode terminal. The second pack parallel coupler is configured to couple the battery packs coupled to the pack couplers in parallel.

The output voltage switch is configured to switch an electrical coupling state between the second pack parallel coupler and the outputter. The output voltage switch is configured to switch a coupling state of the positive electrode terminal of each of the battery packs coupled to the second pack parallel coupler either to a state coupled only to the second positive electrode output terminal or to a state coupled at least to the first positive electrode output terminal. The output voltage switch is configured to switch a coupling state of the negative electrode terminal of each of the battery packs coupled to the second pack parallel coupler to either a state coupled to the first positive electrode output terminal or to a state coupled to the ground output terminal.

The controller is configured to determine an output mode of the outputter. The output mode corresponds to a magnitude of voltage to be outputted from the outputter. The controller is configured to control the output voltage switch based on a result of determination by the controller.

This power supplier uses the battery packs coupled to pack couplers (four or more pack couplers) to output a voltage from the outputter. The battery packs are coupled to either one of the first pack parallel coupler and the second pack parallel coupler. The power supplier is configured to change the coupling state between the second pack parallel coupler and the outputter (ground output terminal, first positive electrode output terminal, or second positive electrode output terminal) while fixing a coupling state between the first pack parallel coupler and the outputter (ground output terminal, or first positive electrode output terminal).

Since the configuration as above can reduce patterns of the coupling state, as compared to changing the coupling state between the battery packs (four or more battery packs) and the outputter to various patterns, the output voltage switch can be simplified. Therefore, cost increase of the output voltage switch can be suppressed.

The controller determines the output mode and controls the output voltage switch based on a result of determination. As a result, it is possible to change the output mode and achieve the output mode suitable for application.

According to this power supplier, device configuration can be simplified upon changing the output mode, and cost increase can be suppressed. In other words, this power supplier can achieve power supply using battery packs with simplified circuit configuration and reduce cost.

The first pack parallel coupler may include individual switches each coupled to a corresponding one of the pack couplers of the first pack parallel coupler in series. The second pack parallel coupler may include individual switches each coupled to a corresponding one of the pack couplers of the second pack parallel coupler in series. The controller may be configured to control the individual switches of the first pack parallel coupler, the individual switches of the second pack parallel coupler, and the output voltage switch so that one of the battery packs is coupled between the ground output terminal and the first positive electrode output terminal.

This allows the power supplier to output a rated output voltage of one battery pack from the first positive electrode output terminal and the ground output terminal and to suppress charging (or discharge) between the battery packs due to direct parallel coupling of two or more battery packs.

As to the rated output voltage of the battery pack herein, for example, the rated output voltage of one lithium ion battery is 3.6 V. The battery pack having an 18 V rated output voltage means the battery pack with five lithium ion batteries coupled in series. The actual output voltage of the battery pack may fluctuate depending on change in power remaining energy. For example, when the rated output voltage is 18 V, the output voltage may fluctuate in a specified range including the rated output voltage (for example, in a range from about 12 V to 20 V).

The first pack parallel coupler may include individual switches each coupled in series to a corresponding one of the pack couplers of the first pack parallel coupler. The second pack parallel coupler may include individual switches each coupled in series to a corresponding one of the pack couplers of the second pack parallel coupler. The controller may control the individual switches of the first pack parallel coupler, the individual switches of the second pack parallel coupler, and the output voltage switch so that two of the battery packs are coupled in series between the ground output terminal and the second positive electrode output terminal.

This allows the power supplier to output the rated output voltage of two battery packs coupled in series from the second positive electrode output terminal and the ground output terminal to an external device of the power supplier, and to suppress charging (or discharge) between the battery packs due to direct parallel coupling of two or more battery packs.

The controller may be configured to control the individual switches of the first pack parallel coupler so that a voltage is outputted from the battery pack having the highest voltage among the battery packs coupled to the first pack parallel coupler. The controller may be configured to control the individual switches of the second pack parallel coupler so that a voltage is outputted from the battery pack having the highest voltage among the battery packs coupled to the second pack parallel coupler.

The power supplier outputs the voltage from the battery pack having the highest voltage among the battery packs of each of the first pack parallel coupler and the second pack parallel coupler every time the voltage is outputted. Therefore, the first pack parallel coupler and the second pack parallel coupler can each select the battery pack to use every time the voltage is outputted. This allows the power supplier to use the battery packs in sequence when outputting the voltage from each of the first pack parallel coupler and the second pack parallel coupler, and suppress continuous use of one battery pack. Thus, shortening of battery pack life can be suppressed.

The controller may be configured to acquire identifier information.

Further, the controller may determine the output mode based on the identifier information.

The power supplier can change the output mode of the outputter in accordance with a request from an output source of the identifier information (for example, external device of the power supplier). The identifier information may be acquired, for example, as an electrical signal, by operation input using a user operating device provided in the power supplier, and so on.

The controller may control the output voltage switch to couple one of the battery packs between the ground output terminal and the first positive electrode output terminal in response to acquisition of a first identifier as the identifier information. Also, the controller may control the output voltage switch to couple two of the battery packs between the ground output terminal and the second positive electrode output terminal in response to acquisition of a second identifier as the identifier information.

This power supplier can change the output mode of the outputter to one of at least two output modes (output mode to output the rated output voltage of one battery pack, and output mode to output a doubled voltage of one battery pack) based on a command from the external device of the power supplier by controlling the output voltage switch in accordance with the acquired identifier information.

The controller may control the output voltage switch to stop outputting the voltage from the outputter in response to non-acquisition of the identifier information by the controller. This power supplier can suppress the inappropriate output mode against the command from the external device of the power supplier, and reduce damage of the electric device coupled to the outputter.

The pack couplers of the first pack parallel coupler may include three or more pack couplers. The pack couplers of the second pack parallel coupler may include three or more pack couplers.

Since each of the first pack parallel coupler and the second pack parallel coupler includes three or more pack couplers, more battery packs as the whole power supplier can be coupled, and the voltage can be outputted for a longer time than a case of including two pack couplers.

The battery packs may be configured to output state notification signals that represent states of the battery packs. The controller may determine whether it is possible for the first pack parallel coupler and the second pack parallel coupler to output the voltage based on the state notification signals outputted from the battery packs coupled to the first pack parallel coupler and the second pack parallel coupler. The controller may be configured to control transmission of a discharge permission signal to the electric device coupled to the outputter based on a result of determination by the controller.

The power supplier can notify the electric device coupled to the outputter whether electric power can be supplied from the power supplier by controlling transmission (output/stop) of the discharge permission signal as such. This allows the electric device to determine whether power supply from the power supplier can be received based on the discharge permission signal, without individually determining whether each battery pack of the power supplier can supply electric power due to high temperature or over-discharge. The discharge permission signal is a signal representing whether the power supplier can supply electric power.

The battery packs may be configured to output the state notification signals that represent the states of the battery packs. The controller may determine whether it is possible for at least one of the first pack parallel coupler and the second pack parallel coupler to output the voltage based on the state notification signals in response to acquisition of the first identifier as the identifier information. The controller may be further configured to output the discharge permission signal to the electric device coupled to the outputter in response to determination that it is possible for the at least one of the first pack parallel coupler and the second pack parallel coupler to output the voltage.

This power supplier determines whether it is possible to output the voltage in response to the acquired first identifier based on the state notification signal and outputs the discharge permission signal in accordance with a result of determination. As a result, the power supplier can notify the electric device that it is possible to output the voltage in response to the first identifier.

The controller may be configured to determine whether it is possible for both the first pack parallel coupler and the second pack parallel coupler to output the voltage based on the state notification signals in response to acquisition of the second identifier as the identifier information. The controller may be further configured to output the discharge permission signal to the electric device coupled to the outputter in response to determination that it is possible for both the first pack parallel coupler and the second pack parallel coupler to output the voltage.

The power supplier determines whether it is possible to output the voltage based on the state notification signals in response to the acquired second identifier and outputs the discharge permission signal in accordance with a result of determination. As a result, the power supplier can notify the electric device that it is possible to output the voltage in response to the second identifier.

The controller may be configured to stop outputting the discharge permission signal to the electric device coupled to the outputter in response to the controller being unable to determine the output mode based on the identifier information.

This power supplier can suppress outputting the inappropriate voltage against the command from the external device and can also notify the electric device that it is not possible to output the voltage in accordance with the identifier information.

The battery packs may be configured to output the state notification signals each representing a state of the corresponding one of the battery packs. The controller may be configured to stop outputting the discharge permission signal to the electric device coupled to the outputter in response to a determination that it is not possible for both the first pack parallel coupler and the second pack parallel coupler to output the voltage based on the state notification signals.

This power supplier can notify the electric device that it is not possible for both the first pack parallel coupler and the second pack parallel coupler to output the voltage by stopping the output of the discharge permission signal.

The power supplier may include a battery accommodating body, an output extension cable, at least one external device connector and/or a device connection cable.

The battery accommodating body is configured to accommodate the first pack parallel coupler and the second pack parallel coupler. The output extension cable is configured to couple the outputter to the battery accommodating body. The at least one external device connector is configured to be attached to/detached from the outputter. The device connection cable has a first end electrically coupled to the at least one external device connector, and a second end directly or indirectly coupled to the electric device.

The at least one external device connector may include external device connectors differently configured from each other in accordance with the output mode. Each of the external device connectors may include a first voltage connector. Each of the external device connectors may include a multiple-output connector. Each of the external device connectors may include a second voltage connector.

The first voltage connector may include a ground external terminal coupled to the ground output terminal and/or a first external terminal coupled to the first positive electrode output terminal. The multiple-output connector may include a ground external terminal coupled to the ground output terminal, a first external terminal coupled to the first positive electrode output terminal and/or a second external terminal coupled to the second positive electrode output terminal. The second voltage connector may include a ground external terminal coupled to the ground output terminal and/or a second external terminal coupled to the first positive electrode output terminal or the second positive electrode output terminal.

Since the outputter and the battery accommodating body are coupled via the output extension cable in this power supplier, the output extension cable is deformed by an external force applied to the outputter or the external device connector. Therefore, the external force is likely to be applied in a direction to uncouple the outputter and the external device connector. Thus, when an external force is applied to the outputter or the external device connector, the outputter and the external device connector are uncoupled, and thus the power supplier can suppress the external force from reaching the battery accommodating body and improve user safety of the power supplier, as compared to a case in which the outputter is buried in the battery accommodating body (that is, configured without the output extension cable).

The outputter may include an identifier acquisition terminal configured to acquire the identifier information and/or a permission signal output terminal configured to output the discharge permission signal. The at least one external device connector may include an identifier output terminal configured to be coupled to the identifier acquisition terminal and/or a permission signal acquisition terminal configured to be coupled to the permission signal output terminal.

The power supplier as above can exchange the identifier information and the discharge permission signal between the power supplier and the external device connector (external device in detail).

The at least one external device connector may include an information storage that stores the identifier information.

Since the external device connector includes the information storage as above, it is possible to output the identifier information corresponding to the type of the external device connector from the external device connector to the power supplier, and the output mode of the voltage from the power supplier to the external device connector can be set to the output mode suitable for the type of the external device connector.

In the aforementioned power supply system, the device connection cable coupled to the first voltage connector may include a ground core coupled to the ground external terminal and/or a first voltage core coupled to the first external terminal. The device connection cable coupled to the multiple-output connector may include a ground core coupled to the ground external terminal, a first external core coupled to the first external terminal and/or a second external core coupled to the second external terminal. The device connection cable coupled to the second voltage connector may include a ground core coupled to the ground external terminal and/or a second voltage core coupled to the second external terminal. The first external core of the multiple-output connector may be thinner than the ground core and the second external core of the multiple-output connector.

As above, the multiple-output connector has more terminals and cores than the first voltage connector and the second voltage connector, but the first external core is thinner than the ground core and the second external core. Since the multiple-output connector can reduce the total cross section of the cores as compared to a case in which the first external core has the same thickness as the ground core and the second external core, flexibility of the whole cores can be improved. This allows the multiple-output connector to suppress significant decline of flexibility of the whole cores as compared to the first voltage connector and the second voltage connector, and reduce burden increase of routing operation of the cores.

In addition, employment of the configuration as such allows the cross section (in other words, thickness) of the device connection cable between the external device connector and the external device to be set smaller than the cross section of the output extension cable (cores) between the outputter and the battery accommodating body. This increases flexibility of the device connection cable, and reduces burden at the time of routing operation of the external device.

The cores may be bundled with a single cover member.

BRIEF DESCRIPTION OF THE DRAWINGS

An example embodiment of the present disclosure will be described hereinafter with reference to the accompanying drawings, in which.

DETAILED DESCRIPTION OF EXEMPLARY EMBODIMENTS

The present disclosure should not be limited to the following embodiments, but may be practiced in various forms without departing from the technical scope of the present disclosure.

1. First Embodiment

[1-1. Overall Configuration]

Figure 1:
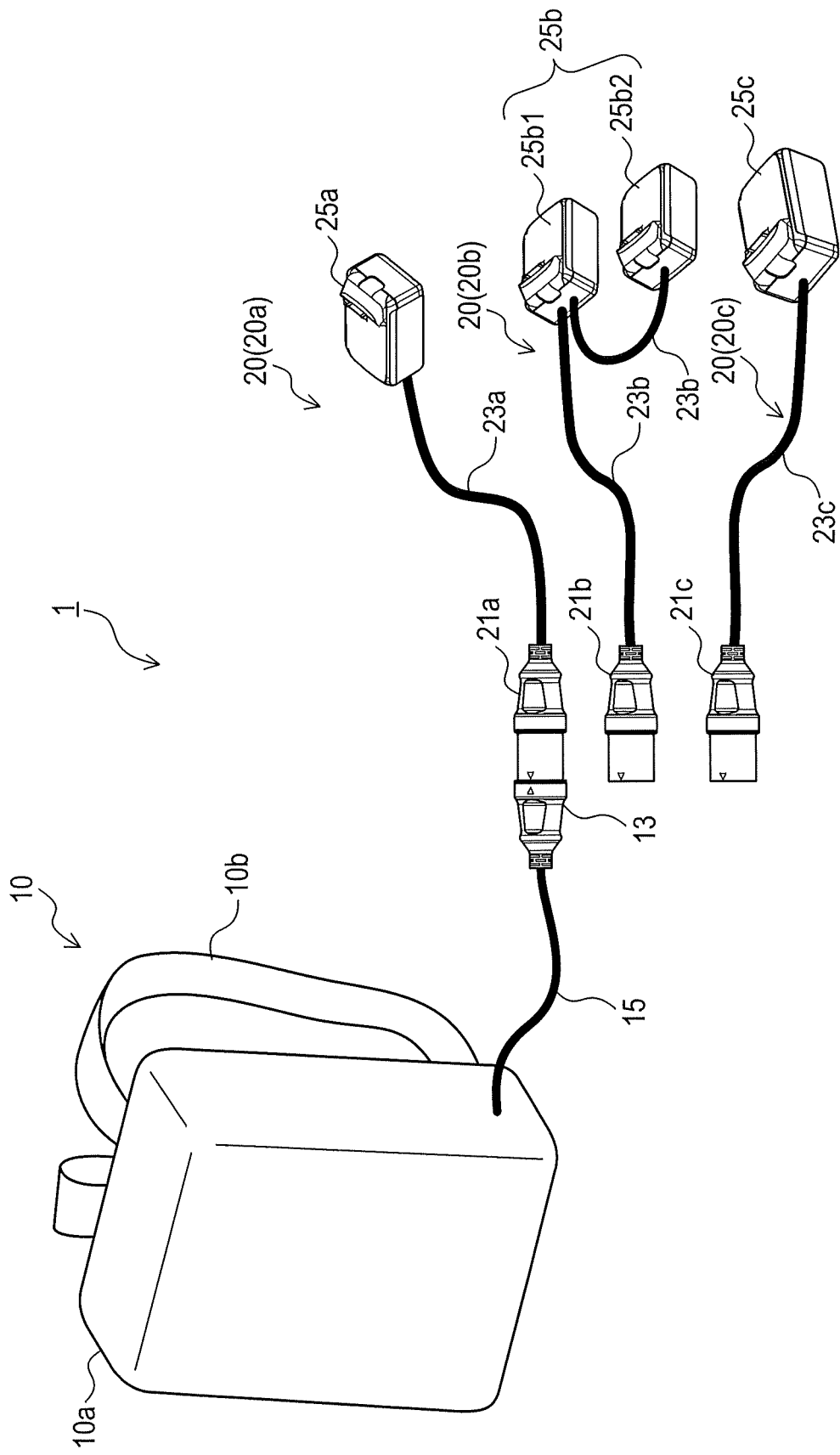
FIG. 1 is an explanatory view showing an overall configuration of a power supply system according to a first embodiment.

As shown in FIG. 1, a power supply system 1 of a first embodiment includes a power supplier 10 and a discharge adapter 20. The power supply system 1 is configured to supply electric power accumulated in the power supplier 10 to an electric device coupled to the discharge adapter 20.

Examples of the electric device are electric power tools, electric working machines, electric gardening equipment, and the like. These electric devices include, for example, a device that is driven by coupling one 18 V battery pack, a device that is driven by coupling two 18 V battery packs, and a device that is driven by coupling one 36 V battery pack.

The power supplier 10 includes a battery accommodating body 10a, a shoulder belt 10b, an output connector 13, and an output extension cable 15.

The battery accommodating body 10a is configured to be able to accommodate battery packs inside. The battery packs are not shown in FIG. 1 since they are provided inside the battery accommodating body 10a. In the present embodiment, the battery accommodating body 10a is provided with eight battery packs 33c1 to 33c4 and 35c1 to 35c4 (see FIG. 2), as described later. The battery pack of the present embodiment has an 18 V rated output voltage.

The shoulder belt 10b is secured to the battery accommodating body 10a so that a user can carry the battery accommodating body 10a on its back. The output connector 13 is coupled to the battery accommodating body 10a via the output extension cable 15. The output connector 13 is configured to be coupled to a connector (one of a first voltage connector 21a, a multiple-output connector 21b, and a second voltage connector 21c to be described later in detail) of the discharge adapter 20.

The discharge adapter 20 includes a first voltage adapter 20a, a multiple-output adapter 20b, and a second voltage adapter 20c. The power supply system 1 is configured to be able to supply electric power to the electric device from the power supplier 10 to the electric device by coupling the discharge adapter 20 instead of a battery pack.

The first voltage adapter 20a is provided with one 18 V voltage output system, and outputs one system of 18 V voltage to the electric device. The first voltage adapter 20a includes the first voltage connector 21a, a device connection cable 23a, and a device unit 25a.

The multiple-output adapter 20b is provided with two 18 V voltage output systems, and outputs two systems of 18 V voltage to the electric device. The multiple-output adapter 20b includes the multiple-output connector 21b, a device connection cable 23b, and a device unit 25b. The device unit 25b includes a first device unit 25b1, and a second device unit 25b2

The second voltage adapter 20c is provided with one 36 V voltage output system, and outputs one system of 36 V voltage to the electric device. The second voltage adapter 20c includes the second voltage connector 21c, a device connection cable 23c, and a device unit 25c.

Each of the device units 25a, 25b, 25c is configured to be attached to/detached from the electric device.

[1-2. Power Supplier]

As described above, the power supplier 10 includes the battery accommodating body 10a, the output connector 13, and the output extension cable 15.

Figure 2:
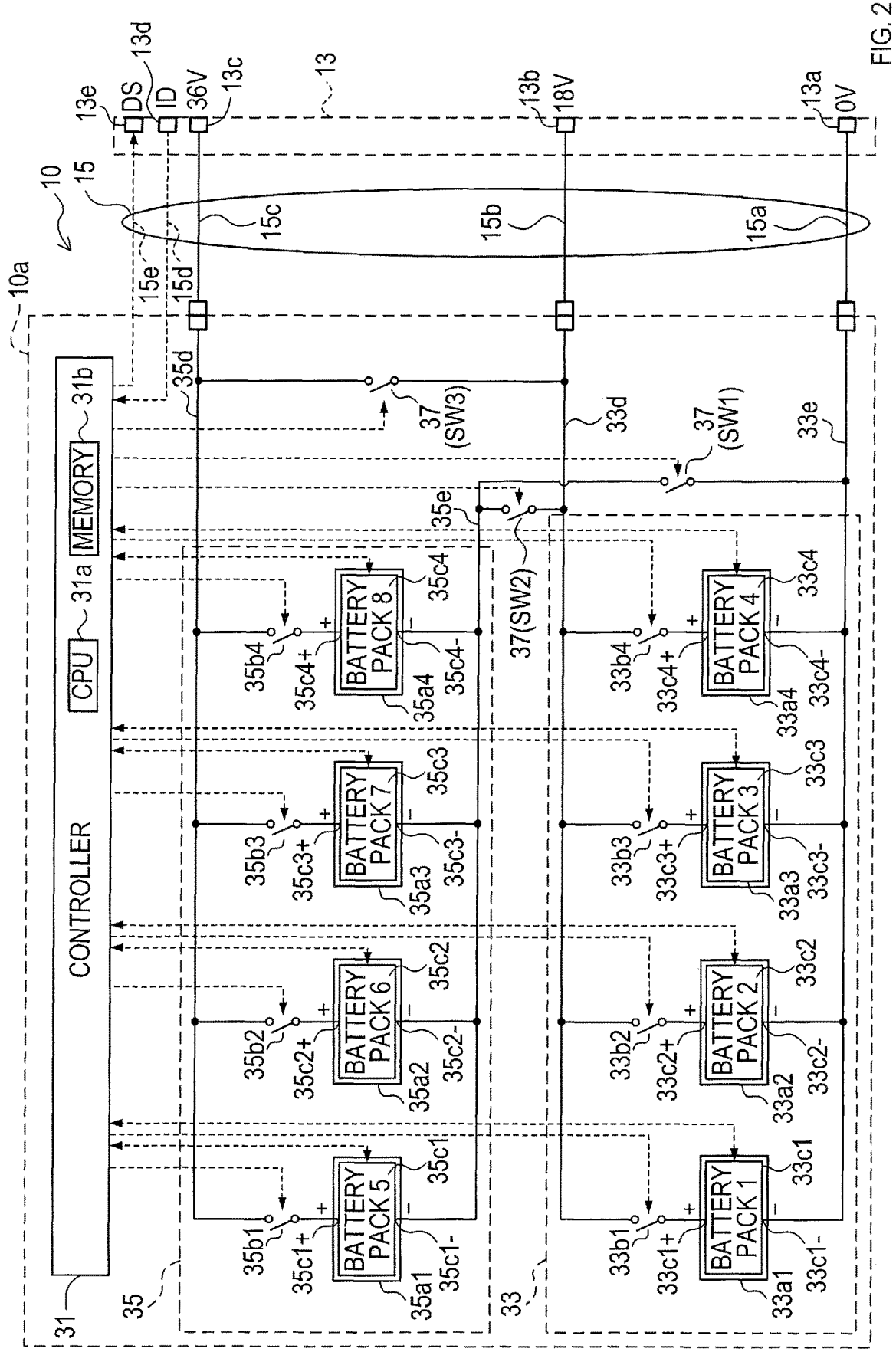
FIG. 2 is an explanatory view showing an electrical configuration of a power supplier.

As shown in FIG. 2, the output connector 13 includes a ground output terminal 13a, a first positive electrode output terminal 13b, a second positive electrode output terminal 13c, an identifier acquisition terminal 13d, and a permission signal output terminal 13e.

The ground output terminal 13a serves as a reference potential (=0 V) of an output voltage. The first positive electrode output terminal 13b is used to output an 18 V voltage(s) as the output voltage. The second positive electrode output terminal 13c is used to output a 36 V voltage or 18 V voltages as the output voltage. The identifier acquisition terminal 13d acquires identifier information ID. The permission signal output terminal 13e outputs a discharge permission signal DS.

The output extension cable 15 electrically couples the output connector 13 with the battery accommodating body 10a. The output extension cable 15 has cores. The cores include voltage output cores 15a, 15b, 15c and signal cores 15d, 15e. The voltage output cores 15a, 15b, 15c are respectively coupled to the ground output terminal 13a, the first positive electrode output terminal 13b, and the second positive electrode output terminal 13c. The signal cores 15d, 15e are respectively coupled to the identifier acquisition terminal 13d, and the permission signal output terminal 13e.

As shown in FIG. 2, the battery accommodating body 10a includes a controller 31, a first pack parallel coupler 33, a second pack parallel coupler 35, and an output voltage switch 37.

The controller 31 executes various control processes in the battery accommodating body 10a. The controller 31 executes, for example, an output voltage control process to control a voltage outputted from the output connector 13, and a malfunction detection process to detect malfunction of each portion of the battery accommodating body 10a. The controller 31 includes a CPU 31a (arithmetic portion 31a), a memory 31b (storage 31b), and the like. Function of the controller 31 is mainly achieved by the CPU 31a executing various programs stored in the memory 31b.

The first pack parallel coupler 33 includes battery couplers 33a1 to 33a4, individual switches 33b1 to 33b4, a first positive electrode path 33d, and a first negative electrode path 33e. In the present embodiment, the first pack parallel coupler 33 is provided with a first battery coupler 33a1, a second battery coupler 33a2, a third battery coupler 33a3, and a fourth battery coupler 33a4 as the battery couplers 33a1 to 33a4, and is provided with a first individual switch 33b1, a second individual switch 33b2, a third individual switch 33b3, and a fourth individual switch 33b4 as the individual switches 33b1 to 33b4.

The first battery coupler 33a1, the second battery coupler 33a2, the third battery coupler 33a3, and the fourth battery coupler 33a4 are respectively configured to be detachably coupled to the first battery pack 33c1, the second battery pack 33c2, the third battery pack 33c3, and the fourth battery pack 33c4. Therefore, when the output voltage of one of the first battery pack 33c1, the second battery pack 33c2, the third battery pack 33c3, and the fourth battery pack 33c4 is reduced (in other words, when power remaining energy is reduced), the battery accommodating body 10a can replace the battery pack. The first battery pack 33c1, the second battery pack 33c2, the third battery pack 33c3, and the fourth battery pack 33c4 respectively have a first positive electrode 33c1+ and a first negative electrode 33c1−, a second positive electrode 33c2+ and a second negative electrode 33c2−, a third positive electrode 33c3+ and a third negative electrode 33c3−, and a fourth positive electrode 33c4+ and a fourth negative electrode 33c4−.

The first positive electrode path 33d is coupled to the first positive electrode output terminal 13b via the voltage output core 15b. The first positive electrode path 33d is configured to couple the first positive electrode 33c1+, the second positive electrode 33c2+, the third positive electrode 33c3+, and the fourth positive electrode 33c4+ to the first positive electrode output terminal 13b in response to the first pack parallel coupler 33 coupling to the first battery pack 33c1, the second battery pack 33c2, the third battery pack 33c3, and the fourth battery pack 33c4.

The first negative electrode path 33e is coupled to the ground output terminal 13a via the voltage output core 15a. The first negative electrode path 33e is configured to couple the first negative electrode 33c1−, the second negative electrode 33c2−, the third negative electrode 33c3−, and the fourth negative electrode 33c4− to the ground output terminal 13a in response to the first pack parallel coupler 33 coupling to the first battery pack 33c1, the second battery pack 33c2, the third battery pack 33c3, and the fourth battery pack 33c4.

The first individual switch 33b1, the second individual switch 33b2, the third individual switch 33b3, and the fourth individual switch 33b4 are respectively coupled to the first battery coupler 33a1, the second battery coupler 33a2, the third battery coupler 33a3, and the fourth battery coupler 33a4 in series. Each of the first individual switch 33b1, the second individual switch 33b2, the third individual switch 33b3, and the fourth individual switch 33b4 is configured to switch to a conducting state (ON state) or an interrupting state (OFF state) based on a control signal from the controller 31.

The first individual switch 33b1 is coupled to the first positive electrode 33c1+ and the first positive electrode path 33d, and is configured to switch to the conducting state or the interrupting state. The first individual switch 33b1 is configured to couple the first positive electrode 33c1+ to the first positive electrode path 33d in response to the first individual switch 33b1 being in the conducting state. The first individual switch 33b1 is configured to uncouple the first positive electrode 33c1+ from the first positive electrode path 33d in response to the first individual switch 33b1 being in the interrupting state.

Although detailed explanation is not given, the second individual switch 33b2, the third individual switch 33b3, and the fourth individual switch 33b4 are respectively configured to couple or uncouple the second positive electrode 33c2+, the third positive electrode 33c3+, and the fourth positive electrode 33c4+ to or from the first positive electrode path 33d in the same way as the first individual switch 33b1.

The first pack parallel coupler 33 is configured to couple the first battery coupler 33a1, the second battery coupler 33a2, the third battery coupler 33a3, and the fourth battery coupler 33a4 in parallel. This enables parallel coupling of the first battery pack 33c1, the second battery pack 33c2, the third battery pack 33c3, and the fourth battery pack 33c4.

When at least one of the first individual switch 33b1, the second individual switch 33b2, the third individual switch 33b3, and the fourth individual switch 33b4 is controlled to the conducting state based on the control signal from the controller 31, the first pack parallel coupler 33 configured as above outputs a voltage using the battery packs 33c1 to 33c4 coupled to the battery couplers 33a1 to 33a4 corresponding to the individual switches 33b1 to 33b4 in the conducting state.

Figure 3:
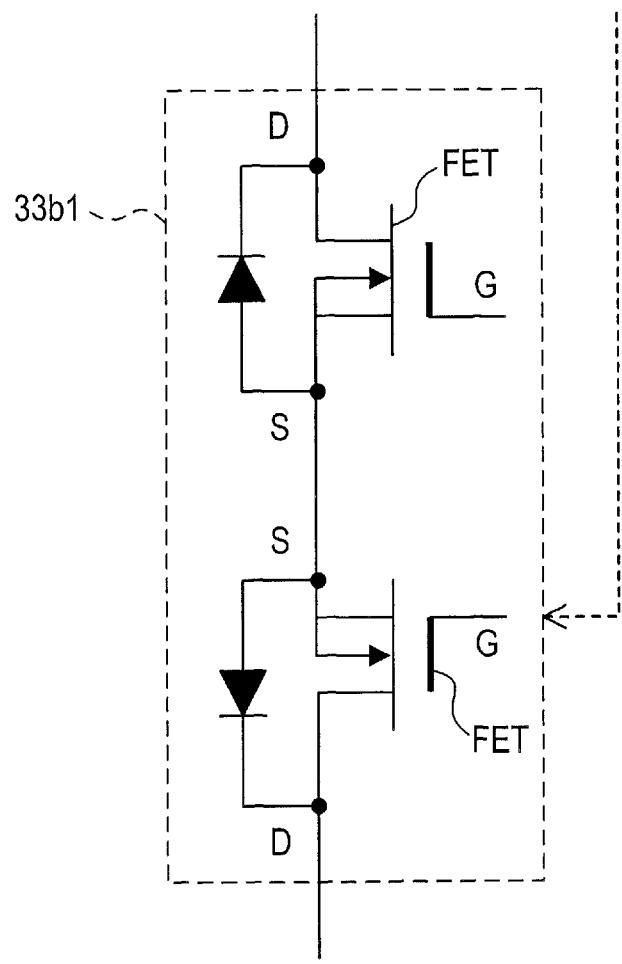
FIG. 3 is a circuit diagram showing one example of an individual switch.

Each of the first individual switch 33b1, the second individual switch 33b2, the third individual switch 33b3, and the fourth individual switch 33b4 can be configured using a switch (such as a mechanical switch, a semiconductor device switch, and the like) that is configured to switch electric current to the conducting state (ON state) or to the interrupting state (OFF state). For example, each of the first individual switch 33b1, the second individual switch 33b2, the third individual switch 33b3, and the fourth individual switch 33b4 may be configured using two Field-Effect Transistors (FETs) coupled to each other as shown in FIG. 3. The two FETs are coupled in series so that current conduction directions between a drain and a source when a voltage is applied to a gate are opposite to each other. Each of the FETs is provided with a parasitic diode coupled in parallel between the drain and the source because of its characteristic, and is configured to enable current conduction in the opposite direction by the parasitic diode when a voltage is not applied to the gate. On the contrary, two FETs coupled as shown in FIG. 3 may be provided to control the two FETs to the interrupting state to stop electric currents in both directions (discharge current and charging current) in the battery pack. The individual switch 33b1 shown in FIG. 3 can be bought into the conducting state by bringing both the two FETs into the conducting state.

Also, each of the first individual switch 33b1, the second individual switch 33b2, the third individual switch 33b3, and the fourth individual switch 33b4 may be configured by a single FET and a single diode coupled in series. In this case, it is preferable that the FET is arranged to allow current conduction in a discharge direction of the battery pack in the ON state and prohibit current conduction in the discharge direction of the battery pack in the OFF state, and that the diode is arranged to allow current conduction in the discharge direction of the battery pack and prohibit current conduction in a charging direction of the battery pack. The individual switch as such can control discharge/stop of the battery pack by the FET being controlled to the ON state or the OFF state based on the control signal from the controller 31.

The second pack parallel coupler 35 includes battery couplers 35a1 to 35a4, individual switches 35b1 to 35b4, a second positive electrode path 35d, and a second negative electrode path 35e. In the present embodiment, the second pack parallel coupler 35 includes a fifth battery coupler 35a1, a sixth battery coupler 35a2, a seventh battery coupler 35a3, and an eighth battery coupler 35a4, as the battery couplers 35a1 to 35a4, and includes a fifth individual switch 35b1, a sixth individual switch 35b2, a seventh individual switch 35b3, and an eighth individual switch 35b4, as the individual switches 35b1 to 35b4. The fifth battery coupler 35a1, the sixth battery coupler 35a2, the seventh battery coupler 35a3, and the eighth battery coupler 35a4 are respectively configured to be detachably coupled to the fifth battery pack 35c1, the sixth battery pack 35c2, the seventh battery pack 35c3, and the eighth battery pack 35c4.

The second positive electrode path 35d is coupled to the second positive electrode output terminal 13c via the voltage output core 15c. The second positive electrode path 35d is configured to couple the fifth positive electrode 35c1+, the sixth positive electrode 35c2+, the seventh positive electrode 35c3+, and the seventh positive electrode 35c4+ to the second positive electrode output terminal 13c, in response to the second pack parallel coupler 35 coupling to the fifth battery pack 35c1, the sixth battery pack 35c2, the seventh battery pack 35c3, and the eighth battery pack 35c4.

The second negative electrode path 35e is configured to couple the fifth negative electrode 35c1−, the sixth negative electrode 35c2−, the seventh negative electrode 35c3−, and the eighth negative electrode 35c4−, in response to the second pack parallel coupler 35 coupling to the fifth battery pack 35c1, the sixth battery pack 35c2, the seventh battery pack 35c3, and the eighth battery pack 35c4.

As shown in FIG. 2, the second pack parallel coupler 35 has the same configuration as the first pack parallel coupler 33, and thus detailed description thereof is not repeated. The battery couplers 35a1 to 35a4 correspond to the battery couplers 33a1 to 33a4, the individual switches 35b1 to 35b4 correspond to the individual switches 33b1 to 33b4, and the battery packs 35c1 to 35c4 correspond to the battery packs 33c1 to 33c4.

The output voltage switch 37 includes a first switch SW1, a second switch SW2, and a third switch SW3. The output voltage switch 37 is configured to switch an electrical coupling state between the second pack parallel coupler 35 and the output connector 13 (ground output terminal 13a, first positive electrode output terminal 13b, or second positive electrode output terminal 13c in detail).

In the output connector 13, the ground output terminal 13a is directly coupled to the first pack parallel coupler 33, and is coupled to the second pack parallel coupler 35 via the output voltage switch 37 (first switch SW1 in detail). The first positive electrode output terminal 13b is directly coupled to the first pack parallel coupler 33, and is coupled to the second pack parallel coupler 35 via the output voltage switch 37 (second switch SW2 and third switch SW3 in detail). The second positive electrode output terminal 13c is directly coupled to the second pack parallel coupler 35.

For coupling with the first pack parallel coupler 33, the ground output terminal 13a is electrically coupled to negative electrodes 33c1− to 33c4− of the battery packs 33c1 to 33c4 via the battery couplers 33a1 to 33a4. For coupling with the second pack parallel coupler 35, the ground output terminal 13a is electrically coupled to negative electrodes 35c1− to 35c4− of the battery packs 35c1 to 35c4 via the output voltage switch 37 (first switch SW1 in detail) and via the battery couplers 35a1 to 35a4.

For coupling with the first pack parallel coupler 33, the first positive electrode output terminal 13b is configured to be electrically coupled to positive electrodes 33c1+ to 33c4+ of the battery packs 33c1 to 33c4 via the individual switch 33b1 to 33b4 and the battery couplers 33a1 to 33a4. For coupling with the second pack parallel coupler 35, the first positive electrode output terminal 13b is configured to be electrically coupled to negative electrodes 35c1− to 35c4− of the battery packs 35c1 to 35c4 via the output voltage switch 37 (second switch SW2 in detail) and the battery couplers 35a1 to 35a4. Further, for coupling with the second pack parallel coupler 35, the first positive electrode output terminal 13b, is configured to be electrically coupled to positive electrodes 35c1+ to 35c4+ of the battery packs 35c1 to 35c4 via the output voltage switch 37 (third switch SW3 in detail), the individual switches 35b1 to 35b4, and the battery couplers 35a1 to 35a4.

For coupling with the second pack parallel coupler 35, the second positive electrode output terminal 13c is configured to be electrically coupled to the positive electrodes 35c1+ to 35c4+ of the battery packs 35c1 to 35c4 via the individual switches 35b1 to 35b4 and the battery couplers 35a1 to 35a4.

In other words, the output voltage switch 37 is configured to switch the coupling state of positive electrodes 35c1+ to 35c4+ of the battery packs 35c1 to 35c4 coupled to the second pack parallel coupler 35 to one of: a state coupled only to the second positive electrode output terminal 13c; and a state coupled at least to the first positive electrode output terminal 13b. The output voltage switch 37 of the present embodiment is configured to achieve a "state coupled to the first positive electrode output terminal 13b and the second positive electrode output terminal 13c" as the "state coupled at least to the first positive electrode output terminal 13b". Also, the output voltage switch 37 is configured to switch the coupling state of the negative electrodes 35c1− to 35c4− of the battery packs 35c1 to 35c4 to one of:

a state coupled to the first positive electrode output terminal 13b, and a state coupled to the ground output terminal 13a.

Also, the first pack parallel coupler 33 is configured to couple the positive electrodes 33c1+ to 33c4+ of the battery packs 33c1 to 33c4 to the first positive electrode output terminal 13b and couple the negative electrodes 33c1− to 33c4− of the battery packs 33c1 to 33c4 to the ground output terminal 13a.

[1-3. Discharge Adapter]

As described above, the discharge adapter 20 includes several types of discharge adapters with different voltage output states for the electric device. The voltage output state means an output mode of a voltage to be outputted by the discharge adapter 20. The discharge adapter 20 of the present embodiment includes the first voltage adapter 20a, the multiple-output adapter 20b, and the second voltage adapter 20c.

The first voltage adapter 20a is configured to output one system of 18 V voltage (rated voltage of one battery pack) to the electric device. The multiple-output adapter 20b outputs two systems of 18 V voltage (rated voltage of one battery pack) to the electric device. The second voltage adapter 20c is configured to output one system of 36 V voltage (doubled rated voltage of one battery pack) to the electric device.

Configuration of each of the first voltage adapter 20a, the multiple-output adapter 20b, and the second voltage adapter 20c will be described.

[1-3-1. First Voltage Adapter]

Figure 4:
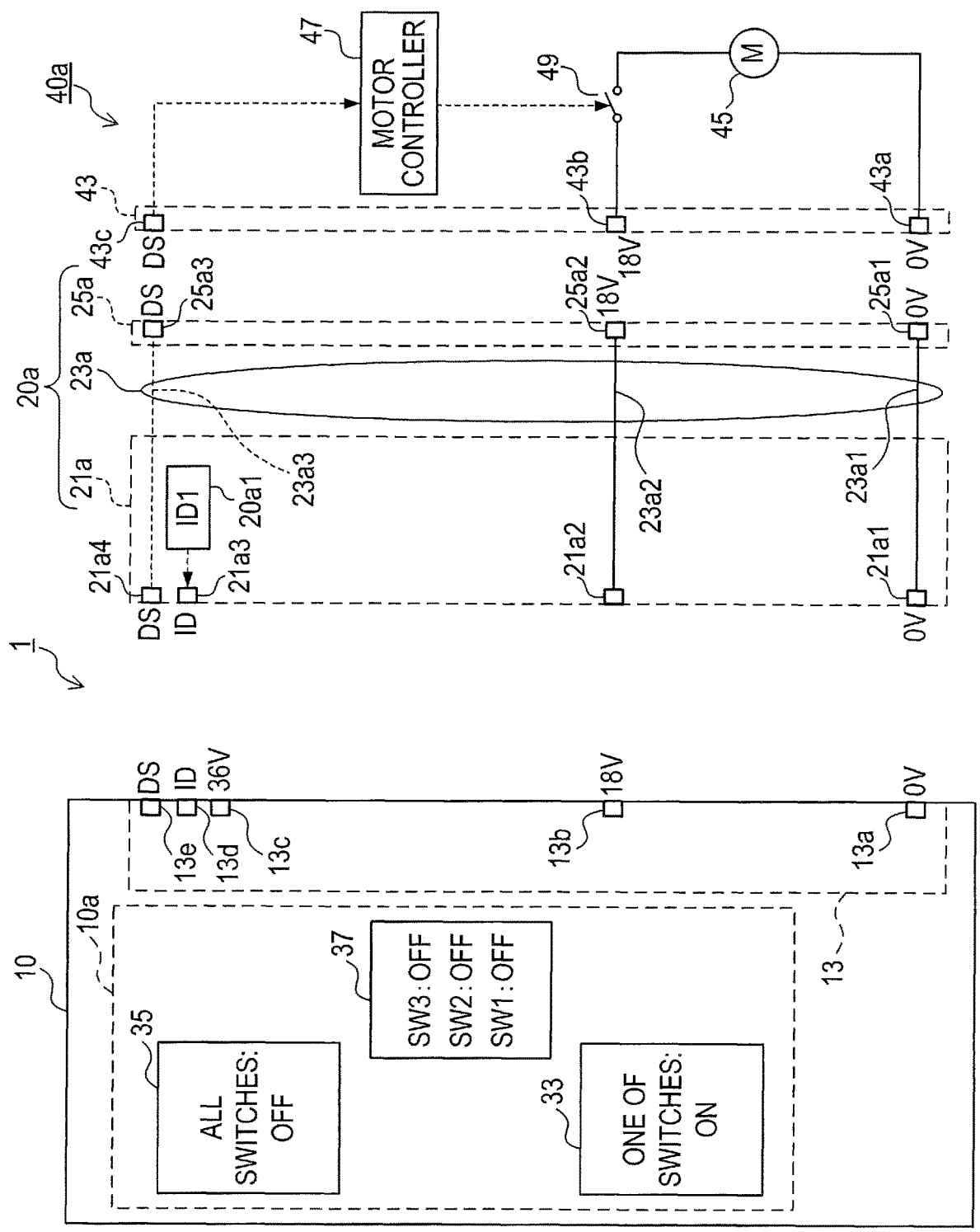
FIG. 4 is an explanatory view showing an electrical configuration of a voltage supplier, a first voltage adapter, and a first electric device.

As shown in FIG. 4, the first voltage adapter 20a includes a first voltage connector 21a, a device connection cable 23a, and a device unit 25a.

The first voltage connector 21a includes a ground external terminal 21a1, a first external terminal 21a2, an identifier output terminal 21a3, and a permission signal acquisition terminal 21a4. The ground external terminal 21a1 is configured to be coupled to the ground output terminal 13a. The first external terminal 21a2 is configured to be coupled to the first positive electrode output terminal 13b. The identifier output terminal 21a3 is configured to be coupled to the identifier acquisition terminal 13d. The permission signal acquisition terminal 21a4 is configured to be coupled to the permission signal output terminal 13e.

The first voltage connector 21a includes an information storage 20a1. The information storage 20a1 is configured to be coupled to the identifier acquisition terminal 13d via the identifier output terminal 21a3. The information storage 20a1 stores identifier information corresponding to the first voltage adapter 20a. The identifier information represents the voltage output state to be outputted from the output connector 13. The information storage 20a1 stores first identifier information ID1 as identifier information corresponding to the first voltage adapter 20a. The first identifier information ID1 represents the voltage output state to output an 18 V voltage using the ground output terminal 13a and the first positive electrode output terminal 13b.

The information storage 20a1, for example, can be configured using a fixed resistance element having an electric resistance value predefined in accordance with the identifier information. In this case, the controller 31 can detect the electric resistance value of the information storage 20a1 to determine the voltage output state suitable for the coupled discharge adapter 20.

When the first identifier information ID1 of the information storage 20a1 is acquired from the first voltage connector 21a, the controller 31 controls a state of the output voltage switch 37 based on the first identifier information ID1. The controller 31, for example, as shown in FIG. 4, controls the state of the output voltage switch 37 so that all of the first switch SW1, the second switch SW2, and the third switch SW3 are in the interrupting state (OFF state). At the same time, the controller 31 sets the individual switch (one of the individual switches 33b1 to 33b4) corresponding to the battery pack having the highest output voltage among the battery pack 33c1 to 33c4 coupled to the first pack parallel coupler 33 to the conducting state (ON state), and sets the individual switches corresponding to the other battery packs to the interrupting state (OFF state). Further, the controller 31 sets all the individual switches 35b1 to 35b4 in the second pack parallel coupler 35 to the interrupting state (OFF state).

This allows the power supplier 10 to output an 18 V voltage from the output connector 13 using the battery packs 33c1 to 33c4 coupled to the first pack parallel coupler 33. FIG. 4 shows a schematic configuration of the output connector 13 and a state of each switch in the battery accommodating body 10a of the power supplier 10. Other configurations are not shown.

Also, the controller 31 outputs the discharge permission signal DS from the permission signal output terminal 13e to the permission signal acquisition terminal 21a4 when it is possible to output the voltage from the output connector 13, and stops outputting the discharge permission signal DS from the permission signal output terminal 13e when it is not possible to output the voltage from the output connector 13. The discharge permission signal DS notifies the electric device coupled to the output connector 13 whether the power supplier 10 can output the voltage.

The device connection cable 23a is electrically coupled to the first voltage connector 21a, and is indirectly coupled to the first electric device 40a via the device unit 25a. The device connection cable 23a includes a ground core 23a1 coupled to the ground external terminal 21a1, a first voltage core 23a2 coupled to the first external terminal 21a2, and a permission signal core 23a3 coupled to the permission signal acquisition terminal 21a4.

The device connection cable 23a is provided in a state in which cores are bundled by a single cover member.

The device unit 25a is configured to be attached to/detached from a battery port 43 of the first electric device 40a. The device unit 25a includes a ground device terminal 25a1, a first device terminal 25a2, and a permission signal device terminal 25a3.

The ground core 23a1 electrically couples the ground external terminal 21a1 of the first voltage connector 21a and the ground device terminal 25a1 of the device unit 25a. The first voltage core 23a2 electrically couples the first external terminal 21a2 of the first voltage connector 21a and the first device terminal 25a2 of the device unit 25a. The permission signal core 23a3 electrically couples the permission signal acquisition terminal 21a4 of the first voltage connector 21a and the permission signal device terminal 25a3 of the device unit 25a.

The first electric device 40a is configured to be driven by receiving 18 V voltage. The first electric device 40a includes the battery port 43, a motor 45, a motor controller 47, and a drive switch 49.

The battery port 43 includes a ground terminal 43a, a first device voltage terminal 43b, and a permission signal reception terminal 43c. The ground terminal 43a is configured to be coupled to the ground device terminal 25a1. The first device voltage terminal 43b is configured to be coupled to the first device terminal 25a2. The permission signal reception terminal 43c is configured to be coupled to the permission signal device terminal 25a3. The battery pack 33c1 and the device unit 25a are configured to be attached to the battery port 43.

The motor 45 is driven to rotate by the voltage applied via the battery port 43 (ground terminal 43a and first device voltage terminal 43b in detail). The motor controller 47, when it receives a drive command (not shown; for example, drive command by trigger operation, and the like) from the user while receiving the discharge permission signal DS from the power supplier 10, controls the drive switch 49 to the ON state to energize the motor 45. The motor controller 47, when it does not receive the drive command from the user even though it receives the discharge permission signal DS from the power supplier 10, controls the drive switch 49 to the OFF state to stop energizing the motor 45. The motor controller 47, when it does not receive the discharge permission signal DS from the power supplier 10 even though it receives the drive command from the user, controls the drive switch 49 to the OFF state to stop energizing the motor 45.

When the first voltage adapter 20a is coupled and when all the battery packs 33c1 to 33c4 coupled to the first pack parallel coupler 33 cannot output the voltage, the power supplier 10 may control the output voltage switch 37 to output the voltage using the battery packs 35c1 to 35c4 coupled to the second pack parallel coupler 35.

Specifically, when the identifier information of the information storage 20a1 is acquired from the first voltage connector 21a, the controller 31 controls the state of the output voltage switch 37 so that the first switch SW1 and the third switch SW3 are in the conducting state (ON state) and the second switch SW2 is in the interrupting state (OFF state). At the same time, the controller 31 sets the individual switch (one of the individual switches 35b1 to 35b4) corresponding to the battery pack having the highest output voltage among the battery packs 35c1 to 35c4 coupled to the second pack parallel coupler 35 to the conducting state (ON state), and sets the individual switches corresponding to the other battery packs to the interrupting state (OFF state). Further, the controller 31 sets all the individual switches 33b1 to 33b4 in the first pack parallel coupler 33 to the interrupting state (OFF state).

This allows the power supplier 10 to output an 18 V voltage from the output connector 13 using the battery packs 35c1 to 35c4 coupled to the second pack parallel coupler 35.

[1-3-2. Multiple-Output Adapter]

Figure 5:
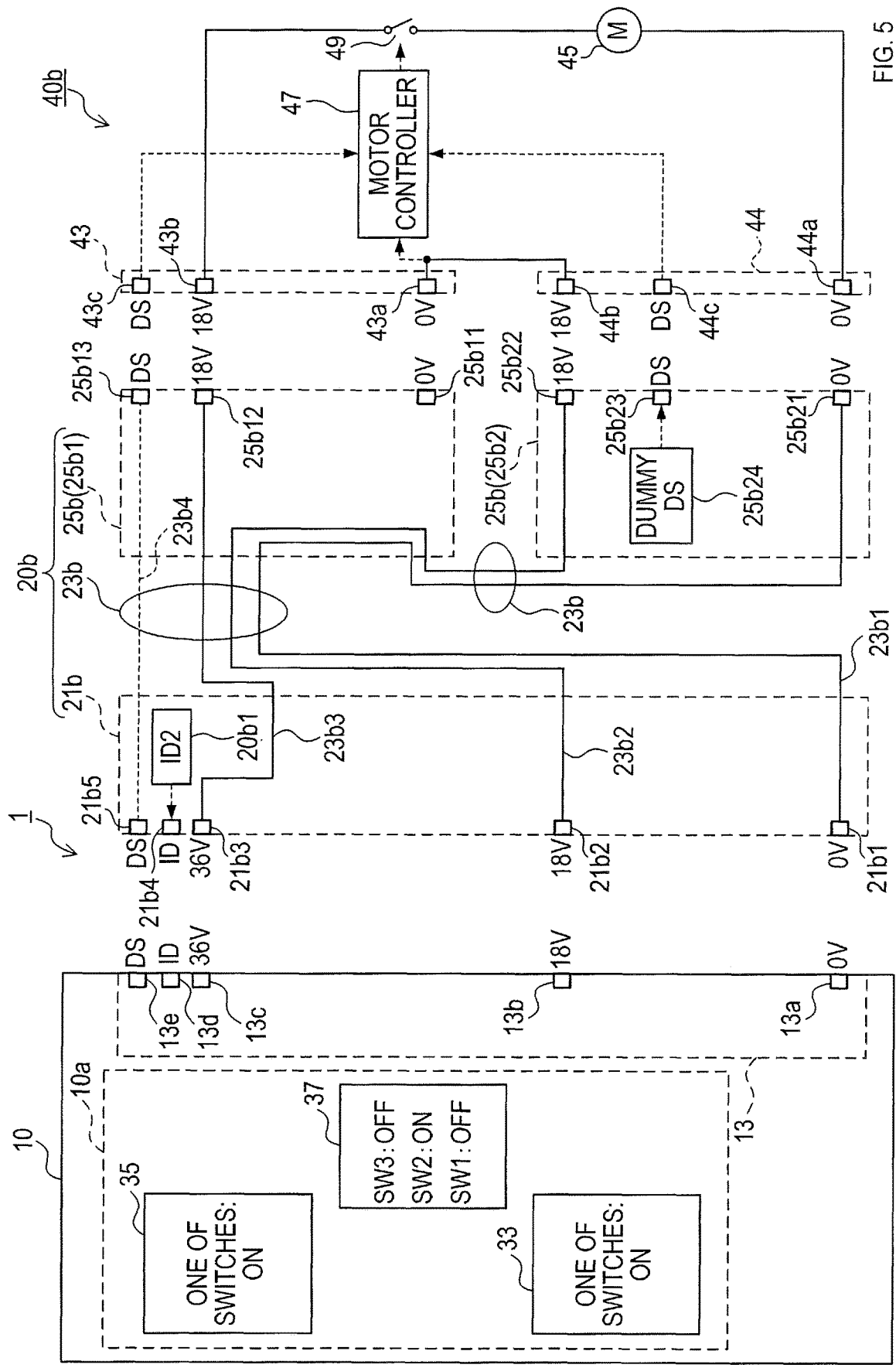
FIG. 5 is an explanatory view showing an electrical configuration of the voltage supplier, a multiple-output adapter, and a second electric device.

As shown in FIG. 5, the multiple-output adapter 20b includes a multiple-output connector 21b, a device connection cable 23b, and a device unit 25b. The device unit 25b includes a first device unit 25b1 and a second device unit 25b2.

The multiple-output connector 21b includes a ground external terminal 21b1, a first external terminal 21b2, an second external terminal 21b3, an identifier output terminal 21b4, and a permission signal acquisition terminal 21b5. The ground external terminal 21b1 is configured to be coupled to the ground output terminal 13a. The first external terminal 21b2 is configured to be coupled to the first positive electrode output terminal 13b. The second external terminal 21b3 is configured to be coupled to the second positive electrode output terminal 13c. The identifier output terminal 21b4 is configured to be coupled to the identifier acquisition terminal 13d. The permission signal acquisition terminal 21b5 is configured to be coupled to the permission signal output terminal 13e.

The multiple-output connector 21b includes an information storage 20b1. The information storage 20b1 is configured to be coupled to the identifier acquisition terminal 13d via the identifier output terminal 21b4. The information storage 20b1 stores identifier information corresponding to the multiple-output adapter 20b. The information storage 20b1 stores the second identifier information ID2 as the identifier information corresponding to the multiple-output adapter 20b. The second identifier information ID2 represents the voltage output state provided with two 18 V voltage output systems. In this voltage output state, specifically, the ground output terminal 13a and the first positive electrode output terminal 13b are used to output 18 V output voltage (first system), and the first positive electrode output terminal 13b and the second positive electrode output terminal 13c are used to output 18 V output voltage (second system).

When the second identifier information ID2 of the information storage 20b1 is acquired from the multiple-output connector 21b, the controller 31 controls the state of the output voltage switch 37 based on the second identifier information ID2. The controller 31, for example, as shown in FIG. 5, controls the state of the output voltage switch 37 so that the first switch SW1 and the third switch SW3 are in the interrupting state (OFF state), and the second switch SW2 is in the conducting state (ON state). At the same time, the controller 31 sets the individual switch (one of the individual switches 33b1 to 33b4) corresponding to the battery pack having the highest output voltage among the battery packs 33c1 to 33c4 coupled to the first pack parallel coupler 33 to the conducting state (ON state), and sets the individual switches corresponding to the other battery packs to the interrupting state (OFF state). Further, the controller 31, similarly in the second pack parallel coupler 35, sets the individual switch corresponding to the battery pack having the highest output voltage among the battery packs to the conducting state (ON state), and sets the individual switches corresponding to the other battery packs to the interrupting state (OFF state).

This allows the power supplier 10 to output two systems of 18 V voltage from the output connector 13 using one of the battery packs 33c1 to 33c4 coupled to the first pack parallel coupler 33 and one of the battery packs 35c1 to 35c4 coupled to the second pack parallel coupler 35. FIG. 5 shows a schematic configuration of the output connector 13 and a state of each switch in the battery accommodating body 10a of the power supplier 10. Other configurations are not shown.

The device connection cable 23b is electrically coupled to the multiple-output connector 21b, and is indirectly coupled to the second electric device 40b via the device unit 25b (first device unit 25b1 or the second device unit 25b2). The device connection cable 23b is provided between the multiple-output connector 21b and the first device unit 25b1, and is also provided between the first device unit 25b1 and the second device unit 25b2. The device connection cable 23b includes a ground core 23b1 coupled to the ground external terminal 21b1, a first external core 23b2 coupled to the first external terminal 21b2, a second external core 23b3 coupled to the second external terminal 21b3, and a permission signal core 23b4 coupled to the permission signal acquisition terminal 21b5.

Each of the first device unit 25b1 and the second device unit 25b2 is configured to be attached to/detached from the first battery port 43 and a second battery port 44 of the second electric device 40b. The first device unit 25b1 includes a ground device terminal 25b11, a first device terminal 25b12, and a permission signal device terminal 25b13. The second device unit 25b2 includes a ground device terminal 25*b*21, a first device terminal 25*b*22, and a permission signal device terminal 25*b*23.

The ground core 23*b*1 electrically couples the ground external terminal 21*b*1 of the multiple-output connector 21*b* and the ground device terminal 25*b*21 of the second device unit 25*b*2. The first external core 23*b*2 electrically couples the first external terminal 21*b*2 of the multiple-output connector 21*b* and the first device terminal 25*b*22 of the second device unit 25*b*2. The second external core 23*b*3 electrically couples the second external terminal 21*b*3 of the multiple-output connector 21*b* and the first device terminal 25*b*12 of the first device unit 25*b*1. The permission signal core 23*b*4 electrically couples the permission signal acquisition terminal 21*b*5 of the multiple-output connector 21*b* and the permission signal device terminal 25*b*13 of the first device unit 25*b*1.

The first external core 23*b*2 is thinner (have a smaller diameter) than the ground core 23*b*1 and the second external core 23*b*3.

Each of the ground core 23*b*1 and the first external core 23*b*2 is provided to reach the second device unit 25*b*2 from the multiple-output connector 21*b* via the first device unit 25*b*1. Also, the ground device terminal 25*b*11 of the first device unit 25*b*1 is not coupled to any core of the device connection cable 23*b*. Further, the second device unit 25*b*2 includes a dummy permission signal storage 25*b*24. The dummy permission signal storage 25*b*24 is coupled to the permission signal device terminal 25*b*23, and outputs a dummy permission signal DS to output the discharge permission signal to the second electric device 40*b* via the permission signal device terminal 25*b*23 at all time.

The second electric device 40*b* is configured to be driven by receiving two 18 V voltage systems. The second electric device 40*b* includes the first battery port 43, the second battery port 44, the motor 45, the motor controller 47, and the drive switch 49.

The first battery port 43 includes the ground terminal 43*a*, the first device voltage terminal 43*b*, and the permission signal reception terminal 43*c*. The ground terminal 43*a* is configured to be coupled to the ground device terminal 25*b*11. The first device voltage terminal 43*b* is configured to be coupled to the first device terminal 25*b*12. The permission signal reception terminal 43*c* is configured to be coupled to the permission signal device terminal 25*b*13.

The second battery port 44 includes a ground terminal 44*a*, a first device voltage terminal 44*b*, and a permission signal reception terminal 44*c*. The ground terminal 44*a* is configured to be coupled to the ground device terminal 25*b*21. The first device voltage terminal 44*b* is configured to be coupled to the first device terminal 25*b*22. The permission signal reception terminal 44*c* is configured to be coupled to the permission signal device terminal 25*b*23.

The motor 45 is driven to rotate by the voltage applied via the first battery port 43 (first device voltage terminal 43*b* in detail) and the second battery port 44 (ground terminal 44*a* in detail). The motor controller 47, when it receives the drive command (not shown) from the user while receiving the discharge permission signal DS from the power supplier 10, controls the drive switch 49 to the ON state and energizes the motor 45. The motor controller 47, when it does not receive the drive command from the user even though it receives the discharge permission signal DS from the user, controls the drive switch 49 to the OFF state and stops energizing the motor 45. The motor controller 47, when it does not receive the discharge permission signal DS from the power supplier 10 even though it receives the drive command from the user, controls the drive switch 49 to the OFF state and stops energizing the motor 45.

[1-3-3. Second Voltage Adapter]

Figure 6:
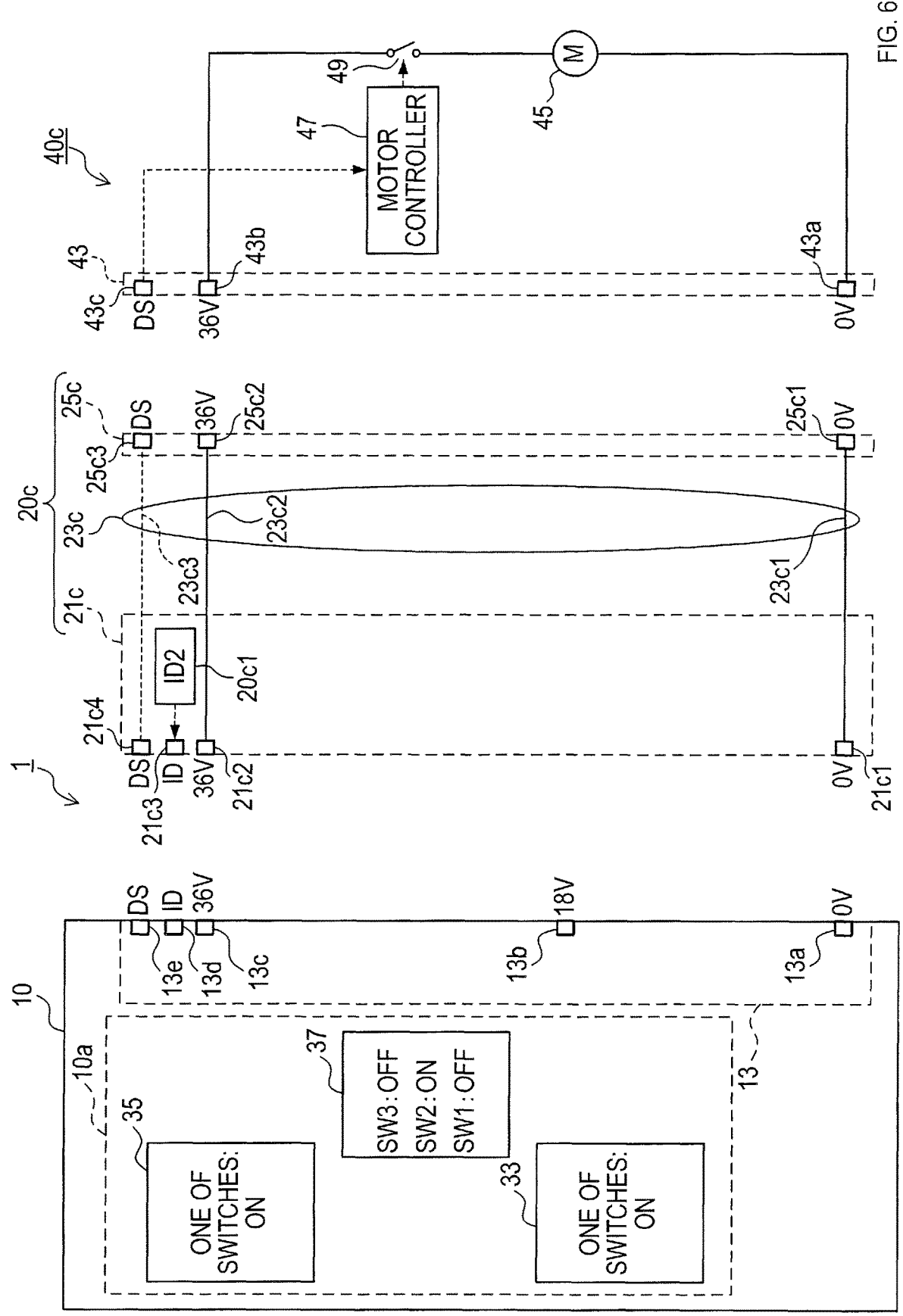
FIG. 6 is an explanatory view showing an electrical configuration of the voltage supplier, a second voltage adapter, and a third electric device.

As shown in FIG. 6, the second voltage adapter 20*c* includes the second voltage connector 21*c*, the device connection cable 23*c*, and the device unit 25*c*.

The second voltage connector 21*c* has a ground external terminal 21*c*1, a second external terminal 21*c*2, an identifier output terminal 21*c*3, and a permission signal acquisition terminal 21*c*4. The ground external terminal 21*c*1 is configured to be coupled to the ground output terminal 13*a*. The second external terminal 21*c*2 is configured to be coupled to the second positive electrode output terminal 13*c*. The identifier output terminal 21*c*3 is configured to be coupled to the identifier acquisition terminal 13*d*. The permission signal acquisition terminal 21*c*4 is configured to be coupled to the permission signal output terminal 13*e*.

The second voltage connector 21*c* includes an information storage 20*c*1. The information storage 20*c*1 is configured to be coupled to the identifier acquisition terminal 13*d* via the identifier output terminal 21*c*3. The information storage 20*c*1 stores identifier information corresponding to the second voltage adapter 20*c*. The information storage 20*c*1 stores second identifier information ID2 as the identifier information corresponding to the second voltage adapter 20*c*. The second identifier information ID2 represents a voltage output state to output a 36 V voltage using the ground output terminal 13*a* and the second positive electrode output terminal 13*c*.

In the present embodiment, the identifier information ID stored in the information storage 20*b*1 of the multiple-output connector 21*b* and the identifier information ID stored in the information storage 20*c*1 of the second voltage connector 21*c* are the same second identifier information ID2. This is because the multiple-output adapter 20*b* and the second voltage adapter 20*c* have the same voltage output states when electric power is received from the power supplier 10. If the multiple-output adapter 20*b* and the second voltage adapter 20*c* have different voltage output states from each other, when electric power is received from the power supplier 10, each information storage may store different identifier information.

The controller 31 controls the state of the output voltage switch 37 based on the second identifier information ID2, when the second identifier information ID2 of the information storage 20*c*1 is acquired from the second voltage connector 21*c*. The controller 31, for example, as shown in FIG. 6, controls the state of the output voltage switch 37 so that the first switch SW1 and the third switch SW3 are in the interrupting state (OFF state) and the second switch SW2 is in the conducting state (ON state). At the same time, the controller 31 sets the individual switch (one of the individual switch 33*b*1 to 33*b*4) corresponding to the battery pack having the highest output voltage among the battery packs 33*c*1 to 33*c*4 coupled to the first pack parallel coupler 33 to the conducting state (ON state), and sets the individual switches corresponding to the other battery packs to the interrupting state (OFF state). Further, the controller 31, similarly in the second pack parallel coupler 35, sets the individual switch corresponding to the battery pack having the highest output voltage among the battery packs to the conducting state (ON state), and sets the individual switches corresponding to the other battery packs to the interrupting state (OFF state).

This allows the power supplier 10 to output a 36 V voltage from the output connector 13 using one of the battery packs 33c1 to 33c4 coupled to the first pack parallel coupler 33 and one of the battery packs 35c1 to 35c4 coupled to the second pack parallel coupler 35. FIG. 6 shows a schematic configuration of the output connector 13 and a state of each switch in the battery accommodating body 10a of the power supplier 10. Other configurations are not shown.

The device connection cable 23c is electrically coupled to the second voltage connector 21c, and is indirectly coupled to the third electric device 40c via the device unit 25c. The device connection cable 23c includes a ground core 23c1 coupled to the ground external terminal 21c1, a second voltage core 23c2 coupled to the second external terminal 21c2, and a permission signal core 23c3 coupled to the permission signal acquisition terminal 21c4.

The device unit 25c is configured to be attached to/detached from the battery port 43 of the third electric device 40c. The device unit 25c includes a ground device terminal 25c1, a second device terminal 25c2, and a permission signal device terminal 25c3.

The ground core 23c1 electrically couples the ground external terminal 21c1 of the second voltage connector 21c and the ground device terminal 25c1 of the device unit 25c. The second voltage core 23c2 electrically couples the second external terminal 21c2 of the second voltage connector 21c and the second device terminal 25c2 of the device unit 25c. The permission signal core 23c3 electrically couples the permission signal acquisition terminal 21c4 of the second voltage connector 21c and the permission signal device terminal 25c3 of the device unit 25c.

The third electric device 40c is configured to be driven by receiving 36 V voltage. The third electric device 40c includes the battery port 43, the motor 45, the motor controller 47, and the drive switch 49.

The battery port 43, the motor 45, the motor controller 47, and the drive switch 49 of the third electric device 40c respectively have substantially the same configuration as the battery port 43, the motor 45, the motor controller 47, and the drive switch 49 of the first electric device 40a, except for the drive voltage (36 V and not 18 V). Thus, detailed description thereof is not repeated.

[1-4. Output Voltage Control]

The output voltage control process, which is one of the various control processes executed by the power supplier 10, will be described. The controller 31 of the power supplier 10 executes the various control processes such as the output voltage control process. The output voltage control process is a process to acquire the identifier information ID from the discharge adapter 20 coupled to the output connector 13 and output a voltage from the output connector 13 in the voltage output state corresponding to the identifier information ID.

Figure 7:
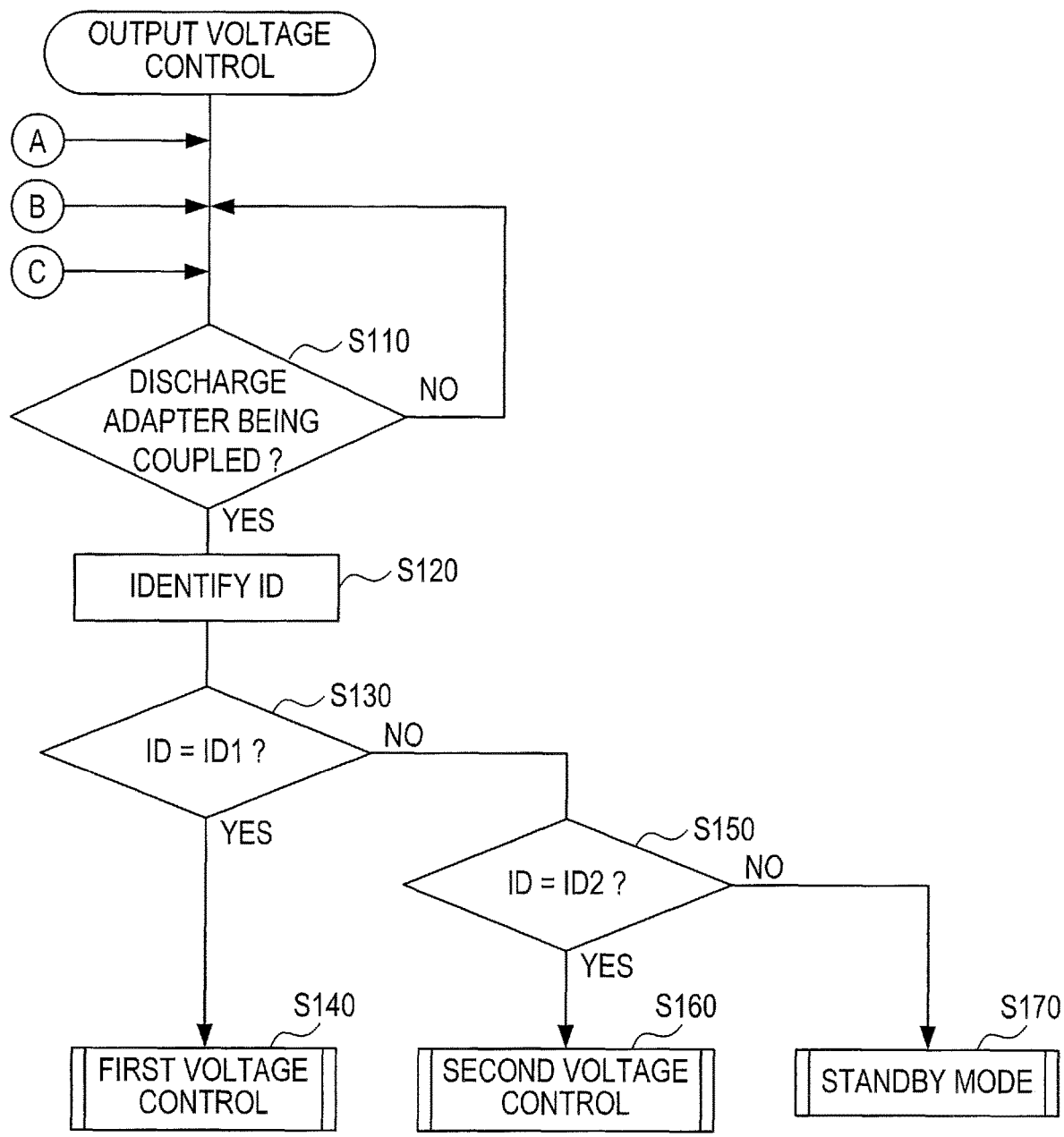
FIG. 7 is a flowchart showing steps of an output voltage control process.

When a start switch (not shown) of the power supplier 10 is operated by the user, the controller 31 starts the output voltage control process. FIG. 7 shows a flowchart of the output voltage control process.

When the output voltage control process is started, the controller 31 firstly determines in S110 (S represents a step) whether the discharge adapter 20 is coupled to the output connector 13. When the result of determination is positive, the controller 31 moves to S120. When the result of determination is negative, the controller 31 repeatedly executes the same step to wait.

The controller 31, when making a positive determination in S110 and moving to S120, acquires the identifier information ID from the discharge adapter 20. In the present embodiment, as described above, there are the first identifier information ID1 and the second identifier information ID2 as the identifier information ID.

The controller 31 determines, in subsequent S130, whether the acquired identifier information ID is the first identifier information ID1. When the result of determination is positive, the controller 31 moves to S140 to execute a first voltage control process. When the result of determination is negative, the controller 31 moves to S150.

The controller 31, when making a negative determination in S130 and moving to S150, determines whether the acquired identifier information ID is the second identifier information ID2. When the result of determination is positive, the controller 31 moves to S160 to execute a second voltage control process. When the result of determination is negative, the controller 31 moves to S170 to execute a standby mode process.

Figure 8:
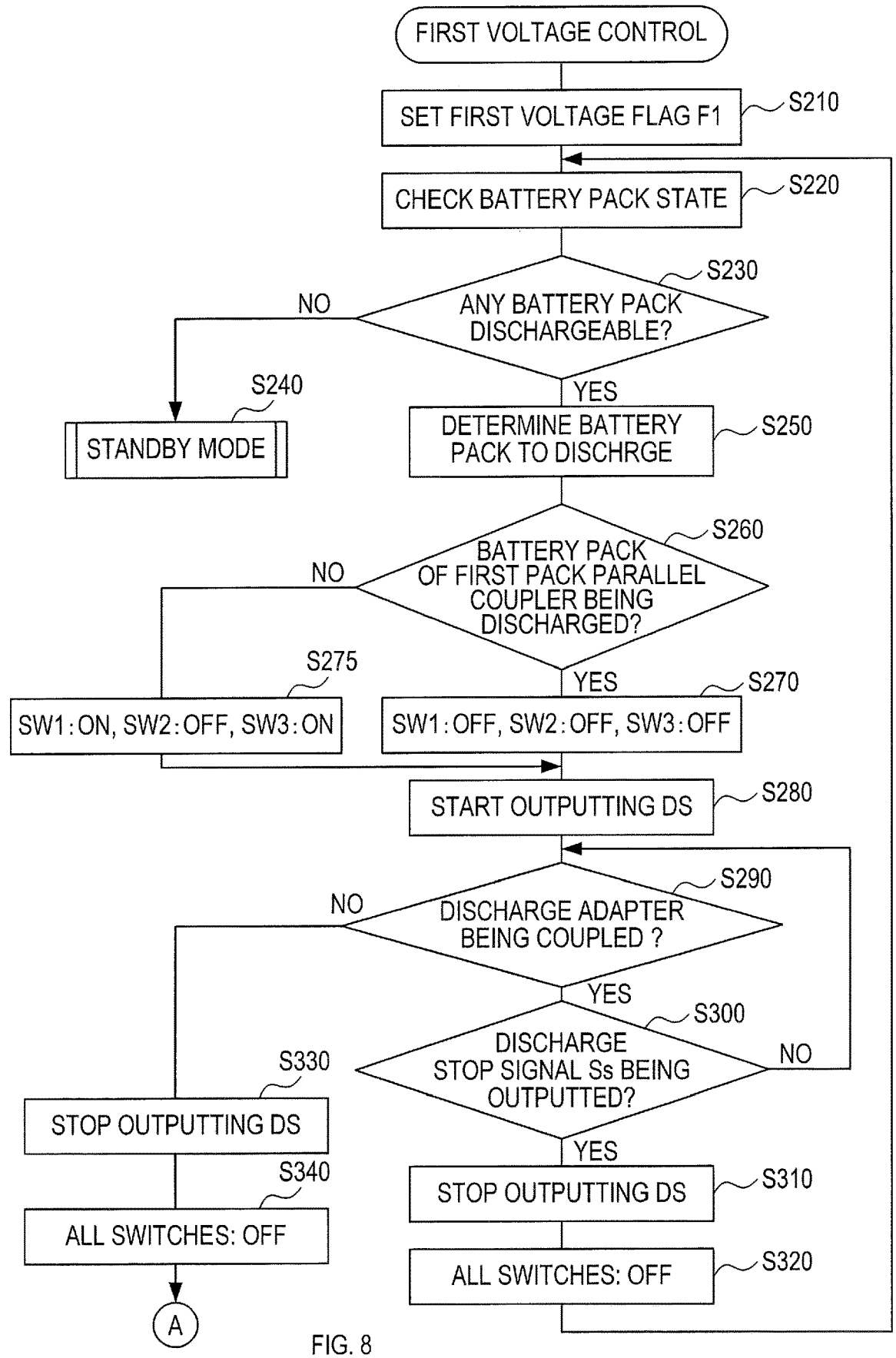
FIG. 8 is a flowchart showing steps of a first voltage control process.

Steps of the first voltage control process (S140) will be described referring to a flowchart in FIG. 8.

When the first voltage control process is started, the controller 31 firstly sets a first voltage flag F1 in S210.

The controller 31, in subsequent S220, checks the states of the battery packs 33c1 to 33c4 coupled to the first pack parallel coupler 33 and the battery packs 35c1 to 35c4 coupled to the second pack parallel coupler 35. Also, the controller 31 detects an output voltage value of each battery pack, and checks whether the battery pack can output the voltage (dischargeable) based on the result of detection. Further, the controller 31 may check whether a discharge stop signal Ss is outputted from each battery pack. The discharge stop signal Ss is a notification signal outputted when the battery pack determines that it is undischargeable based on a self-diagnosis result. The battery pack may become undischargeable, for example, due to low power remaining energy, temperature rise of the pack, and so on.

The controller 31, in subsequent S230, determines whether there is a dischargeable battery pack among the coupled battery packs. When the result of determination is positive, the controller 31 moves to S250. When the result of determination is negative, the controller 31 moves to S240 to execute the standby mode process.

The controller 31, when making a positive determination in S230 and moving to S250, determines the battery pack to discharge from among the battery packs 33c1 to 33c4 and 35c1 to 35c4. The controller 31 determines the battery pack having the highest power remaining energy (or the battery pack having the highest output voltage) as the battery pack to discharge. The controller 31 controls the individual switch corresponding to the battery pack to discharge, among the individual switches 33b1 to 33b4 and 35b1 to 35b4, to the conducting state (ON state), and controls the other individual switches to the interrupting state (OFF state).

The controller 31, in subsequent S260, determines whether the battery pack coupled to the first pack parallel coupler 33 is discharged. When the result of determination is positive, the controller 31 moves to S270. When the result of determination is negative, the controller 31 move to S275. In other words, in S260, it is determined whether the battery pack coupled to the first pack parallel coupler 33 or the battery pack coupled to the second pack parallel coupler 35 is discharged.

The controller 31, in S270, controls all of the first switch SW1, the second switch SW2, and the third switch SW3 of the output voltage switch 37 to the interrupting state (OFF state). This causes the battery packs 33c1 to 33c4 coupled to the first pack parallel coupler 33 to discharge, so that the voltage can be outputted from the output connector 13.

The controller 31, in S275, controls the first switch SW1 and the third switch SW3 of the output voltage switch 37 to the conducting state (ON state), and controls the second switch SW2 to the interrupting state (OFF state). This causes the battery packs 35c1 to 35c4 coupled to the second pack parallel coupler 35 to discharge, so that the voltage can be outputted from the output connector 13.

The controller 31, in subsequent S280, starts outputting the discharge permission signal DS from the permission signal output terminal 13e.

The controller 31, in subsequent S290, determines whether the discharge adapter 20 is coupled. When the result of determination is positive, the controller 31 moves to S300. When the result of determination is negative, the controller 31 moves to S330.

The controller 31, in S300, determines whether the discharge stop signal Ss is outputted from the battery pack being discharged (battery pack determined in S250). When the result of determination is positive, the controller 31 moves to S310. When the result of determination is negative, the controller 31 moves to S290 again. The battery pack, when becoming undischargeable, outputs the discharge stop signal Ss to the controller 31. The battery pack may become undischargeable, for example, due to low power remaining energy, temperature rise of the pack, and so on.

The controller 31, in S310, stops outputting the discharge permission signal DS from the permission signal output terminal 13e. The controller 31, in subsequent S320, controls the output voltage switch 37 (first switch SW1, second switch SW2, and third switch SW3), and all the individual switches 33b1 to 33b4 and 35b1 to 35b4 to the interrupting state (OFF state). When the process in S320 is complete, the controller 31 moves to S220 again.

The controller 31, when making a negative determination in S290 and moving to S330, stops outputting the discharge permission signal DS from the permission signal output terminal 13e. The controller 31, in subsequent S340, control the output voltage switch 37 (first switch SW1, second switch SW2, and third switch SW3) and all the individual switches 33b1 to 33b4 and 35b1 to 35b4 to the interrupting state (OFF state). When the process in S340 is complete, the controller 31 ends the first voltage control process and moves to S110 again.

Figure 9:
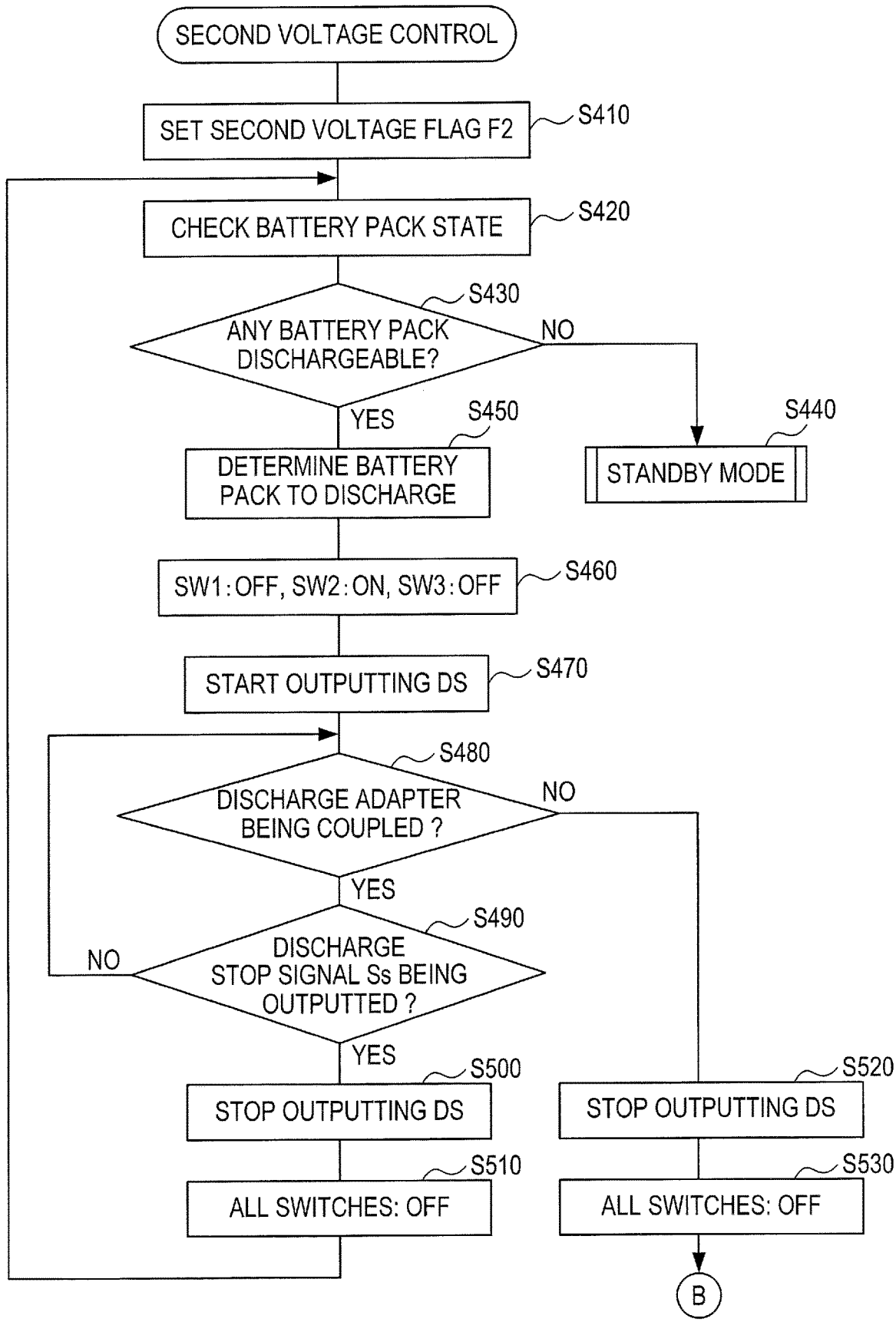
FIG. 9 is a flowchart showing steps of a second voltage control process.

Steps of the second voltage control process (S160) will be described referring to a flowchart in FIG. 9.

When the second voltage control process is started, the controller 31 first sets a second voltage flag F2 in S410.

The controller 31, in subsequent S420, checks the states of the battery packs 33c1 to 33c4 coupled to the first pack parallel coupler 33 and the battery packs 35c1 to 35c4 coupled to the second pack parallel coupler 35. Also, the controller 31 detects the output voltage value of each battery pack, and checks whether the battery pack can output the voltage (dischargeable) based on the result of detection. Further, the controller 31 may check whether the discharge stop signal Ss is outputted from each battery pack.

The controller 31, in subsequent S430, determines whether there is a dischargeable battery pack among the battery packs. When the result of determination is positive, the controller 31 moves to S450. When the result of determination is negative, the controller 31 moves to S440 to execute the standby mode process.

The controller 31, when making a positive determination in S430 and moving to S450, determines one battery pack to discharge from among the battery packs 33c1 to 33c4 coupled to the first pack parallel coupler 33, and also determines one battery pack to discharge from among the battery packs 35c1 to 35c4 coupled to the second pack parallel coupler 35. The battery pack having the highest power remaining energy (or the battery pack having the highest output voltage) is determined as the battery pack to discharge for each of the first pack parallel coupler 33 and the second pack parallel coupler 35. The controller 31 controls the individual switches corresponding to the battery packs to discharge from among the individual switches 33b1 to 33b4 and 35b1 to 35b4 to the conducting state (ON state), and controls the other individual switches to the interrupting state (OFF state).

The controller 31, in subsequent S460, controls the first switch SW1 and the third switch SW3 of the output voltage switch 37 to the interrupting state (OFF state), and controls the second switch SW2 thereof to the conducting state (ON state). This causes the battery packs 33c1 to 33c4 coupled to the first pack parallel coupler 33 and the battery packs 35c1 to 35c4 coupled to the second pack parallel coupler 35 to discharge, so that the voltage can be outputted from the output connector 13.

The controller 31, in subsequent S470, starts outputting the discharge permission signal DS from the permission signal output terminal 13e.

The controller 31, in subsequent S480, determines whether the discharge adapter 20 is coupled. When the result of determination is positive, the controller 31 moves to S490. When the result of determination is negative, the controller 31 moves to S520.

The controller 31, in S490, determines whether the discharge stop signal Ss is outputted from at least one of the two battery packs (two battery packs determined in S450) being discharged. When the result of determination is positive, the controller 31 moves to S500. When the result of determination is negative, the controller 31 moves to S480 again.

The controller 31, in S500, stops outputting the discharge permission signal DS from the permission signal output terminal 13e. The controller 31, in subsequent S510, controls the output voltage switch 37 (first switch SW1, second switch SW2, and third switch SW3) and all the individual switches 33b1 to 33b4 and 35b1 to 35b4 to the interrupting state (OFF state). When the process in S510 is complete, the controller 31 moves to S420 again.

The controller 31, when making a negative determination in S480 and moving to S520, stops outputting the discharge permission signal DS from the permission signal output terminal 13e. The controller 31, in subsequent S530, controls the output voltage switch 37 (first switch SW1, second switch SW2, and third switch SW3) and all the individual switches 33b1 to 33b4 and 35b1 to 35b4 to the interrupting state (OFF state). When the process in S530 is complete, the controller 31 ends the second voltage control process and moves to S110 again.

Figure 10:
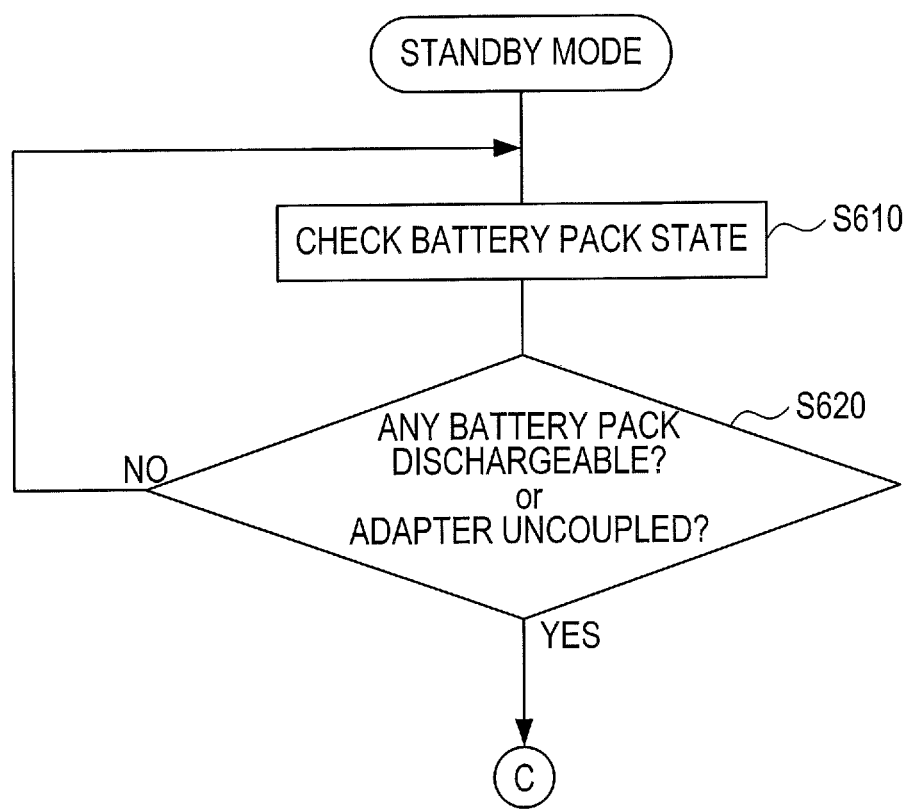
FIG. 10 is a flowchart showing steps of a standby mode process.

Steps of the standby mode process (S170, S240 and S440) will be described referring to a flowchart of FIG. 10.

When the standby mode process is started, the controller 31 first checks the states of the battery packs 33c1 to 33c4 coupled to the first pack parallel coupler 33 and the states of the battery packs 35c1 to 35c4 coupled to the second pack parallel coupler 35 in S610. At the same time, the controller 31 detects the output voltage value of each battery pack, and checks whether the battery pack can output the voltage (dischargeable) based on the result of detection. Further, the controller 31 may check whether the discharge stop signal Ss is outputted from each battery pack.

The controller 31, in subsequent S620, determines whether there is a dischargeable battery pack among the coupled battery packs, and determines whether the discharge adapter 20 is uncoupled.

When there is a dischargeable battery pack, or the discharge adapter 20 is uncoupled, the controller 31 makes a positive determination to end the standby mode process and moves to S110 again. When there is no dischargeable battery pack and the discharge adapter 20 is coupled, the controller 31 makes a negative determination and moves to S610 again.

As described above, the power supplier 10 executes the output voltage control process to determine the type of the coupled discharge adapter 20 (first voltage adapter 20a, multiple-output adapter 20b, or second voltage adapter 20c), and outputs the voltage from the output connector 13 in the voltage output state corresponding to the type of the discharge adapter 20.

[1-5. Effect]

As described above, the power supplier 10 provided in the power supply system 1 of the present embodiment, when outputting the voltage from the output connector 13 using the battery packs 33c1 to 33c4 and 35c1 to 35c4 coupled to the battery couplers 33a1 to 33a4 and 35a1 to 35a4 (four or more battery couplers), classifies the battery packs 33c1 to 33c4 and 35c1 to 35c4 into two groups of the first pack parallel coupler 33 and the second pack parallel coupler 35. After classifying the battery packs 33c1 to 33c4 and 35c1 to 35c4 into the two group, the power supplier 10 is configured to switch the coupling state between the second pack parallel coupler 35 and the output connector 13 (ground output terminal 13a, first positive electrode output terminal 13b, or second positive electrode output terminal 13c) while fixing the coupling state between the first pack parallel coupler 33 and the output connector 13 (ground output terminal 13a, or first positive electrode output terminal 13b).

Since the configuration as above can reduce patterns of the coupling state as compared to a configuration to switch the coupling state between the battery packs (four or more battery packs) and the outputter (output connector) to various patterns, the output voltage switch 37 can be simplified. Therefore, the power supplier 10 can suppress cost increase of the output voltage switch 37.

The controller 31 determines the voltage output state to be outputted from the output connector 13, and controls the output voltage switch 37 based on the result of determination. As a result, it is possible to switch the voltage output states and achieve the voltage output states suitable for application.

According to the power supplier 10, device configuration can be simplified upon switching the voltage output states, and cost increase can be suppressed.

The first pack parallel coupler 33 includes the individual switches 33b1 to 33b4 respectively coupled to the battery couplers 33a1 to 33a4 in series, and the second pack parallel coupler 35 includes the individual switches 35b1 to 35b4 respectively coupled to the battery coupler 35a1 to 35a4 in series. The controller 31 can control the individual switches 33b1 to 33b4 and 35b1 to 35b4 and the output voltage switch 37 so that one of the battery packs 33c1 to 33c4 and 35c1 to 35c4 is coupled between the ground output terminal 13a and the first positive electrode output terminal 13b. Specifically, this is the voltage output state when the first voltage adapter 20a is coupled (see FIG. 4), which is the voltage output state when the first voltage control process (S140) is executed.

This allows the power supplier 10 to output the rated output voltage (18 V) of one battery pack from the first positive electrode output terminal 13b and the ground output terminal 13a to outside (discharge adapter 20, and first electric device 40a in detail).

The controller 31 can control the individual switches 33b1 to 33b4 and 35b1 to 35b4 and the output voltage switch 37 so that two of the battery packs 33c1 to 33c4 and 35c1 to 35c4 are coupled between the ground output terminal 13a and the second positive electrode output terminal 13c in series. Specifically, this is the voltage output state when the second voltage adapter 20c is coupled (see FIG. 6), which is the voltage output state when the second voltage control process (S160) is executed.

This allows the power supplier 10 to output the output voltage of the two battery packs coupled in series (for example, doubled rated output voltage of the battery pack: 36 V) from the second positive electrode output terminal 13c and the ground output terminal 13a.

The controller 31 is configured to control the individual switches 33b1 to 33b4 and 35b1 to 35b4 to output the voltage using the battery pack having the highest current voltage among the battery packs 33c1 to 33c4 and 35c1 to 35c4 coupled to the first pack parallel coupler 33 and the second pack parallel coupler 35 respectively.

The power supplier 10 as above outputs the voltage using the battery pack having the highest current voltage among the battery packs 33c1 to 33c4 and 35c1 to 35c4 every time the voltage is outputted for each of the first pack parallel coupler 33 and the second pack parallel coupler 35. Therefore, the battery pack to use can be switched every time the voltage is outputted. This allows the power supplier 10 to use the battery packs in sequence when outputting the voltage from each of the first pack parallel coupler 33 and the second pack parallel coupler 35, and suppress continuous use of one battery pack. Thus, shortening of battery pack life can be suppressed.

The controller 31 determines the voltage output state to be outputted from the output connector 13 based on the identifier information ID acquired from the discharge adapter 20 (output voltage control process: S120 to S160). The power supplier 10 can switch the voltage output state in accordance with a request from outside (in other words, intention of the user who selected the discharge adapter 20). The identifier information may be acquired, for example, by receiving the identifier information as an electrical signal, by operation output using a user operating device provided in the power supplier, and so on.

When the first identifier information ID1 (identifier information showing the voltage output state to output the rated output voltage of one battery pack) is acquired as the identifier information, the controller 31 controls the output voltage switch 37 to couple one of the battery packs 33c1 to 33c4 and 35c1 to 35c4 between the ground output terminal 13a and the first positive electrode output terminal 13b. Also, when the second identifier information ID2 (identifier information showing the voltage output state to output a doubled output voltage of one battery pack) is acquired as the identifier information, the controller 31 controls the output voltage switch 37 to couple two battery packs coupled in series of the battery packs 33c1 to 33c4 and 35c1 to 35c4 between the ground output terminal 13a and the second positive electrode output terminal 13c.

The power supplier 10, by controlling the output voltage switch 37 in accordance with the acquired identifier information ID, can change the voltage output state to be outputted from the output connector 13 to one of at least two output states (voltage output state to output the rated output voltage of one battery pack, and voltage output state to output a doubled output voltage of one battery pack) based on a command from outside of the power supplier 10.

When the identifier information ID cannot be acquired, the controller 31 controls the output voltage switch 37 to stop outputting the voltage from the output connector 13 (S170: standby mode). The power supplier 10 can suppress inappropriate voltage output state (state to output excessive voltage and the like) against the command from outside of the power supplier 10, and reduce damage of the electric device coupled to the output connector 13.

The first pack parallel coupler 33 includes three or more battery couplers 33a1 to 33a4, and the second pack parallel coupler 35 includes three or more battery couplers 35a1 to 35a4. As such, since each of the first pack parallel coupler 33 and the second pack parallel coupler 35 includes three or more battery couplers, more battery packs as the whole power supplier 10 can be coupled and the voltage can be outputted for a longer time than a case of including two battery couplers.

The battery packs 33c1 to 33c4 and 35c1 to 35c4 are configured to output the discharge stop signals Ss as the state notification signals each representing the state of the corresponding battery pack. The controller 31 determines whether the first pack parallel coupler 33 and the second pack parallel coupler 35 can output the voltage respectively based on the discharge stop signals Ss of the battery packs 33c1 to 33c4 and 35c1 to 35c4 coupled to the first pack parallel coupler 33 and the second pack parallel coupler 35 (S300 and S490). The controller 31 is configured to control the output state of the discharge permission signal DS to the electric device coupled to the output connector 13 based on the result of determination (S310 and S500).

The power supplier 10 can notify the electric device coupled to the output connector 13 directly or indirectly via other members whether electric power can be supplied from the power supplier 10 by controlling the output state (output/stop) of the discharge permission signal DS as such. This allows the electric device to determine whether power supply can be received from the power supplier 10 based on the discharge permission signal DS, without individually determining whether each battery pack of the power supplier can supply electric power due to high temperature or overdischarge. The discharge permission signal DS is a signal representing whether the power supplier 10 can supply electric power.

The controller 31 is configured to output the discharge permission signal DS to the electric device coupled to the output connector 13 (S280), when the first identifier information ID1 is acquired as the identifier information ID and when it is determined that at least one of the first pack parallel coupler 33 and the second pack parallel coupler 35 can output the voltage based on the state notification signals (discharge stop signals Ss) indicating the states of the battery packs (positive determination in S230).

Also, the controller 31 is configured to output the discharge permission signal DS to the electric device coupled to the output connector 13 (S470), when the second identifier information ID2 is acquired as the identifier information ID and when it is determined that both the first pack parallel coupler 33 and the second pack parallel coupler 35 can output the voltage (positive determination in S430) based on the state notification signals (discharge stop signals Ss).

The power supplier 10 determines whether the voltage output state corresponding to the acquired identifier information ID can be achieved based on the state notification signals (discharge stop signals Ss) and outputs the discharge permission signal DS in accordance with the result of determination. As a result, the power supplier 10 can notify the electric device that the voltage output state corresponding to the identifier information ID can be achieved.

The controller 31 is configured to stop outputting the discharge permission signal DS to the electric device coupled to the output connector 13 (or not to output the discharge permission signal DS), when determination of the voltage output state based on the identifier information ID is not possible (negative determination in each of S130 and S150) or when it is determined that both the first pack parallel coupler 33 and the second pack parallel coupler 35 cannot output the voltage (when at least one of negative determination in S230, negative determination in S430, positive determination in S300, and positive determination in S490 is applicable) based on the state notification signals (discharge stop signals Ss).

The power supplier 10 as such can suppress inappropriate voltage output state against the command from the external device, and can notify the electric device that the voltage output state corresponding to the identifier information ID cannot be achieved.

The power supply system 1 of the present embodiment includes the power supplier 10, an external device connector (one of the first voltage connector 21a, multiple-output connector 21b, and second voltage connector 21c), and the device connection cables 23a, 23b, 23c. The power supplier 10 includes the battery accommodating body 10a that accommodates the first pack parallel coupler 33 and the second pack parallel coupler 35, and the output extension cable 15 that couples the output connector 13 and the battery accommodating body 10a.

Also, the power supplier 10 provided in the power supply system 1 is configured such that the output connector 13 and the battery accommodating body 10a are coupled via the output extension cable 15. Therefore, as compared to a configuration in which the output connector 13 is buried in the battery accommodating body 10a (configuration without the output extension cable 15), since the output extension cable 15 is deformed in accordance with an external force applied to the output connector 13 or the external device connector (one of the first voltage connector 21a, multiple-output connector 21b, and second voltage connector 21c), the external force is likely to be applied in a direction to uncouple the output connector 13 and the external device connector. Therefore, when an external force is applied, the output connector 13 and the external device connector are uncoupled to reduce the external force to be applied to the battery accommodating body 10a and to enhance user safety of the power supply system 1.

In the power supply system 1, the controller 31 of the power supplier 10 determines the voltage output state to be outputted from the output connector 13 based on the identifier information ID acquired from outside of the power supplier 10. The output connector 13 of the power supplier 10 includes the identifier acquisition terminal 13d to acquire the identifier information ID, and the permission signal output terminal 13e to output the discharge permission signal DS. The external device connectors (first voltage connector 21a, multiple-output connector 21b, and second voltage connector 21c) include the identifier output terminals 21a3, 21b4, 21c3 to output the identifier information ID, and the permission signal acquisition terminals 21a4, 21b5, 21c4 to acquire the discharge permission signal DS. The identifier output terminals 21a3, 21b4, 21c3 are configured to be coupled to the identifier acquisition terminal 13d upon coupling to the output connector 13. The permission signal acquisition terminals 21a4, 21b5, 21c4 are configured to be coupled to the permission signal output terminal 13e upon coupling to the output connector 13.

The power supply system 1 as above can exchange the identifier information ID and the discharge permission signal DS between the power supplier 10 and the external device connectors (first voltage connector 21a, multiple-output connector 21b, and second voltage connector 21c; specifically, electric device coupled via the discharge adapter).

The external device connectors (first voltage connector 21a, multiple-output connector 21b, and second voltage connector 21c) include information storages 20a1, 20b1, 20c1 that store the identifier information ID. As described above, since the external device connectors include the information storages 20a1, 20b1, 20c1, it is possible to output the identifier information ID corresponding to the type of connector (or type of discharge adapter; further, type of electric device) from the external device connectors to the power supplier 10, and set the voltage output state of the external device connectors from the power supplier 10 to the voltage output state suitable for the type of connector.

In the power supply system 1, the first external core 23b2 of the device connection cable 23b coupled to the multiple-output connector 21b is thinner (have a smaller diameter) than the ground core 23b1 and the second external core 23b3 of the device connection cable 23b coupled to the multiple-output connector 21b.

As above, the multiple-output connector 21b has more terminals and cores than the first voltage connector 21a and the second voltage connector 21c, but the first external core 23b2 is thinner than the ground core 23b1 and the second external core 23b3. Since the multiple-output connector 21b can reduce a total cross section of the cores, as compared to a case in which the first external core 23b2 has the same thickness as the ground core 23b1 and the second external core 23b3, flexibility of the whole cores can be improved. This allows the multiple-output connector 21b to suppress significant decline of flexibility of the whole cores in the device connection cable 23b to be coupled, as compared to the first voltage connector 21a and the second voltage connector 21c, and reduce burden increase of routing operation of the cores.

In addition, employment of the configuration as such allows a cross section (in other words, thickness) of the device connection cables 23a, 23b, 23c between the external device connectors and the external device (electric device) to be set smaller than a cross section of the output extension cable 15 between the output connector 13 and the battery accommodating body 10a. This increases flexibility of the device connection cables 23a, 23b, 23c, and reduces burden at the time of routing operation of the external device.

The cores are provided as a device connection cable in a state bundled with a single cover member.

The power supplier 10 includes the battery accommodating body 10a that accommodates the first pack parallel coupler 33 and the second pack parallel coupler 35, and the output extension cable 15 that couples the output connector 13 and the battery accommodating body 10a.

As above, coupling the output connector 13 to the battery accommodating body 10a via the output extension cable 15 allows a position of the output connector 13 to change relative to the battery accommodating body 10a and allows only the output connector 13 to move. Therefore, various use environments are available.

[1-6. Correspondence of Terms]

Correspondence of terms in the present embodiment will be explained.

The first voltage connector 21a, the multiple-output connector 21b, and the second voltage connector 21c each correspond to one example of an external connector.

The battery couplers 33a1 to 33a4 and 35a1 to 35a4 correspond to one example of pack couplers. The output connector 13 corresponds to one example of an outputter.

The discharge stop signal Ss corresponds to one example of a state notification signal.

2. Second Embodiment

As second power supplier 110 including three pack parallel couplers will be described as a second embodiment.

As shown in FIGS. 11 to 14, the second power supplier 110 can be a part of a second power supply system 101. The second power supply system 101 includes the second power supplier 110 and a second discharge adapter 120.

[2-1. Second Power Supplier]

The second power supplier 110, similarly to the power supplier 10 of the first embodiment, includes a battery accommodating body, a shoulder belt, an output connector, and an output extension cable. Since the second power supplier 110 has the same appearance as the power supplier 10, illustration and explanation thereof are not given.

Figure 11:
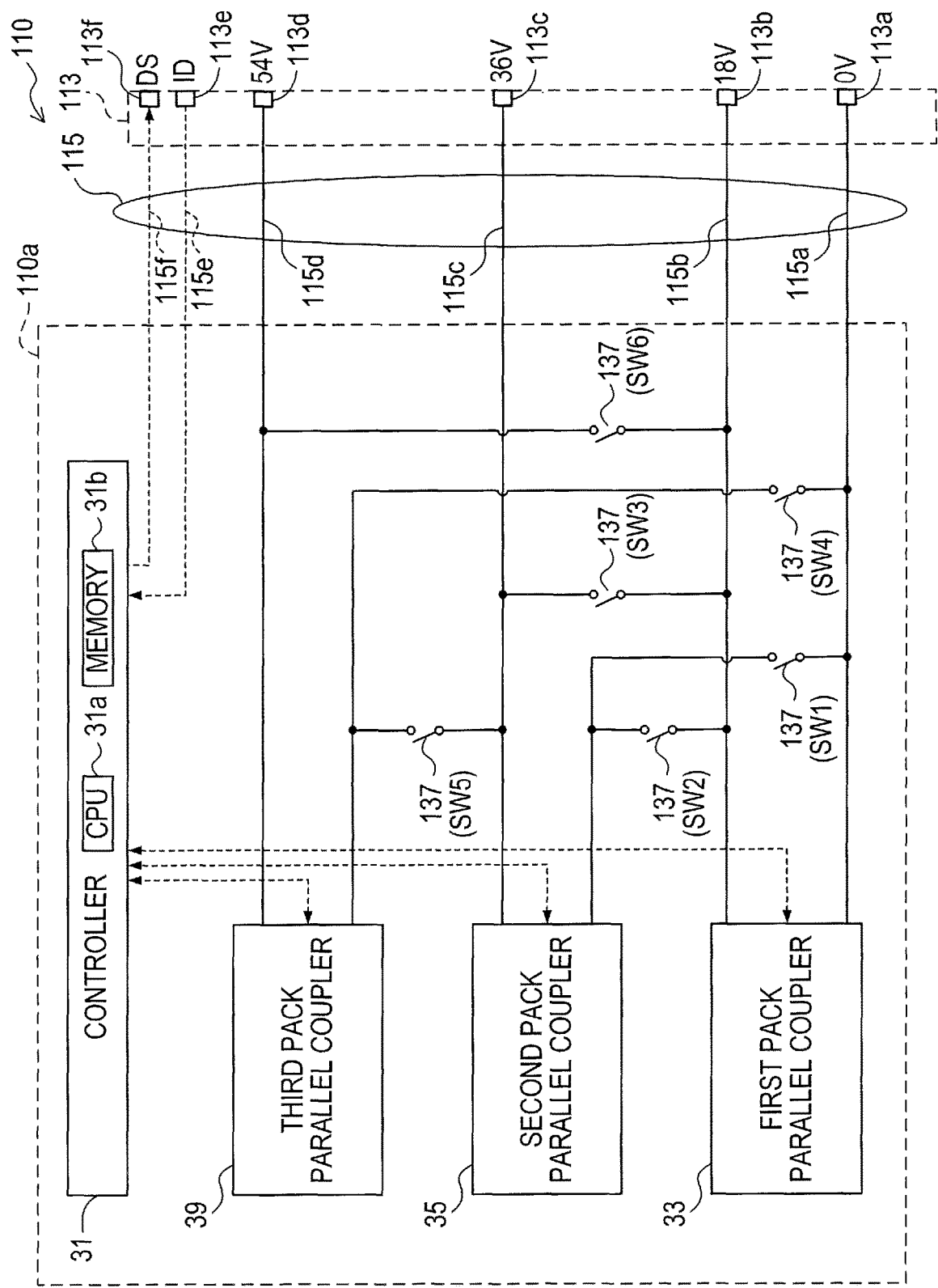
FIG. 11 is an explanatory view showing an electrical configuration of a second power supplier.

The second power supplier 110, as shown in FIG. 11, includes a second battery accommodating body 110a, a second output connector 113, and a second output extension cable 115.

The second output connector 113 includes a ground output terminal 113a, a first positive electrode output terminal 113b, a second positive electrode output terminal 113c, a third positive electrode output terminal 113d, an identifier acquisition terminal 113e, and a permission signal output terminal 113f.

The ground output terminal 113a serves as a reference potential (=0 V) of an output voltage. The first positive electrode output terminal 113b is used to output an 18 V voltage(s) as the output voltage. The second positive electrode output terminal 113c is used to output a 36 V voltage or 18 V voltages as the output voltage. The third positive electrode output terminal 113d is used to output a 54 V voltage or 18 V voltages as the output voltage. The identifier acquisition terminal 113e acquires identifier information ID. The permission signal output terminal 113f outputs a discharge permission signal DS.

The second output extension cable 115 electrically couples the second output connector 113 and the second battery accommodating body 110a. The second output extension cable 115 includes cores. The cores include voltage output cores 115a, 115b, 115c, 115d and signal cores 115e, 115f. The voltage output cores 115a, 115b, 115c, 115d are respectively coupled to the ground output terminal 113a, the first positive electrode output terminal 113b, the second positive electrode output terminal 113c, and the third positive electrode output terminal 113d. The signal cores 115e, 115f are respectively coupled to the identifier acquisition terminal 113e and the permission signal output terminal 113f.

The second battery accommodating body 110a, as shown in FIG. 11, includes the controller 31, the first pack parallel coupler 33, the second pack parallel coupler 35, a third pack parallel coupler 39, and a second output voltage switch 137.

The controller 31 executes various control processes in the second battery accommodating body 110a. The controller 31 executes, for example, an output voltage control process to control a voltage outputted from the second output connector 113, and a malfunction detection process to detect malfunction of each portion of the second battery accommodating body 110a. The controller 31 includes the CPU 31a (arithmetic portion 31a), the memory 31b (storage 31b), and the like. Function of the controller 31 is mainly achieved by the CPU 31a which executes various programs stored in the memory 31b.

The first pack parallel coupler 33 and the second pack parallel coupler 35 have the same configuration as those of the first embodiment. Thus, the description thereof is omitted. The third pack parallel coupler 39, similarly to the first pack parallel coupler 33 and the second pack parallel coupler 35, includes pack couplers (four pack couplers in the present embodiment) and individual switches (four individual switches in the present embodiment), and is configured such that the battery pack is detachably coupled to each of the pack couplers. Since the third pack parallel coupler 39 has the same configuration as the first pack parallel coupler 33 and the second pack parallel coupler 35, detailed description thereof is not given.

The second output voltage switch 137 includes the first switch SW1, the second switch SW2, the third switch SW3, a fourth switch SW4, a fifth switch SW5, and a sixth switch SW6. The second output voltage switch 137 is configured to switch an electrical coupling state between the second pack parallel coupler 35 and the second output connector 113 (ground output terminal 113a, first positive electrode output terminal 113b, second positive electrode output terminal 113c, or third positive electrode output terminal 113d in detail), and an electrical coupling state between the third pack parallel coupler 39 and the second output connector 113.

In the second output connector 113, the ground output terminal 113a is directly coupled to the first pack parallel coupler 33, and is coupled to the second pack parallel coupler 35 and the third pack parallel coupler 39 via the second output voltage switch 137 (first switch SW1 and fourth switch SW4 in detail). The first positive electrode output terminal 113b is directly coupled to the first pack parallel coupler 33, and is coupled to the second pack parallel coupler 35 and the third pack parallel coupler 39 via the second output voltage switch 137 (second switch SW2, third switch SW3 and sixth switch SW6 in detail). The second positive electrode output terminal 113c is directly coupled to the second pack parallel coupler 35, and is coupled to the third pack parallel coupler 39 via the second output voltage switch 137 (fifth switch SW5 in detail). The third positive electrode output terminal 113d is directly coupled to the third pack parallel coupler 39.

For coupling with the first pack parallel coupler 33, the ground output terminal 113a is electrically coupled to negative electrodes 33c1− to 33c4− of the battery packs 33c1 to 33c4 via the pack couplers 33a1 to 33a4. For coupling with the second pack parallel coupler 35, the ground output terminal 113a is electrically coupled to negative electrodes 35c1− to 35c4− of the battery packs 35c1 to 35c4 via the second output voltage switch 137 (first switch SW1 in detail) and via the battery couplers 35a1 to 35a4. For coupling with the third pack parallel coupler 39, the ground output terminal 113a is electrically coupled to negative electrodes of battery packs (not shown) via the second output voltage switch 137 (fourth switch SW4 in detail) and via pack couplers (not shown).

For coupling with the first pack parallel coupler 33, the first positive electrode output terminal 113b is configured to be electrically coupled to positive electrodes 33c1+ to 33c4+ of the battery pack 33c1 to 33c4 via the individual switches 33b1 to 33b4 and the pack couplers 33a1 to 33a4. For coupling with the second pack parallel coupler 35, the first positive electrode output terminal 113b is configured to be electrically coupled to negative electrodes 35c1− to 35c4− of the battery packs 35c1 to 35c4 via the second output voltage switch 137 (second switch SW2 in detail) and via the battery couplers 35a1 to 35a4. Further, for coupling with the second pack parallel coupler 35, the first positive electrode output terminal 113b is configured to be electrically coupled to positive electrodes 35c1+ to 35c4+ of the battery pack 35c1 to 35c4 via the second output voltage switch 137 (third switch SW3 in detail) and via the individual switches 35b1 to 35b4 and the battery couplers 35a1 to 35a4. Further, for coupling with the third pack parallel coupler 39, the first positive electrode output terminal 113b is configured to be electrically coupled to positive electrodes of battery pack (not shown) via the second output voltage switch 137 (sixth switch SW6 in detail) and via individual switches (not shown) and pack couplers (not shown).

For coupling with the second pack parallel coupler 35, the second positive electrode output terminal 113c is configured to be electrically coupled to positive electrodes 35c1+ to 35c4+ of the battery packs 35c1 to 35c4 via the individual switches 35b1 to 35b4 and the battery couplers 35a1 to 35a4. For coupling with the third pack parallel coupler 39, the second positive electrode output terminal 113c is configured to be electrically coupled to negative electrodes—of battery packs (not shown) via the second output voltage switch 137 (fifth switch SW5 in detail) and via pack couplers (not shown).

For coupling with the third pack parallel coupler 39, the third positive electrode output terminal 113d is configured to be electrically coupled to positive electrodes+ of battery packs (not shown) via individual switches (not shown) and pack couplers (not shown).

In other words, the second output voltage switch 137 is configured to switch the coupling state of the positive electrodes 35c1+ to 35c4+ of the battery packs 35c1 to 35c4 coupled to the second pack parallel coupler 35 to one of: a state in which any one of the positive electrodes 35c1+ to 35c4+ is coupled only to the second positive electrode output terminal 113c; and a state in which any one of the positive electrodes 35c1+ to 35c4+ is coupled to at least the first positive electrode output terminal 113b. The second output voltage switch 137 of the present embodiment is configured to achieve a "state in which any one of the positive electrodes 35c1+ to 35c4+ is coupled to the first positive electrode output terminal 113b and the second positive electrode output terminal 113c" as the "state in which any one of the positive electrodes 35c1+ to 35c4+ is coupled to at least the first positive electrode output terminal 113b". Also, the second output voltage switch 137 is configured to switch the coupling state of the negative electrodes 35c1− to 35c4− of each of the battery packs 35c1 to 35c4 coupled to the second pack parallel coupler 35 to one of: a state in which any one of the negative electrodes 35c1− to 35c4− is coupled to the first positive electrode output terminal 113b; and a state in which any one of the negative electrodes 35c1− to 35c4− is coupled to the ground output terminal 113a.

Further, the second output voltage switch 137 is configured to switch the coupling state of the positive electrodes of the battery packs coupled to the third pack parallel coupler 39 to one of: a state in which any one of the positive electrodes is coupled only to the third positive electrode output terminal 113d; and a state in which any one of the positive electrodes is coupled at least to the first positive electrode output terminal 113b. The second output voltage switch 137 of the present embodiment is configured to achieve a "state in which any one of the positive electrodes is coupled to the first positive electrode output terminal 113b and the second positive electrode output terminal 113d" as the "state in which any one of the positive electrodes is coupled at least to the first positive electrode output terminal 113*b*". Also, the second output voltage switch 137 is configured to switch the coupling state of the negative electrodes of the battery packs coupled to the third pack parallel coupler 39 to one of: a state in which any one of the negative electrodes is coupled to the second positive electrode output terminal 113*c*; and a state in which any one of the negative electrodes is coupled to the ground output terminal 113*a*.

Also, the first pack parallel coupler 33 is configured to couple the positive electrodes 33*c*1+ to 33*c*4+ of the battery packs 33*c*1 to 33*c*4 to the first positive electrode output terminal 113*b* and couple the negative electrodes 33*c*1– to 33*c*4– of the battery packs 33*c*1 to 33*c*4 to the ground output terminal 113*a*.

[2-2. Second Discharge Adapter]

Figure 12:
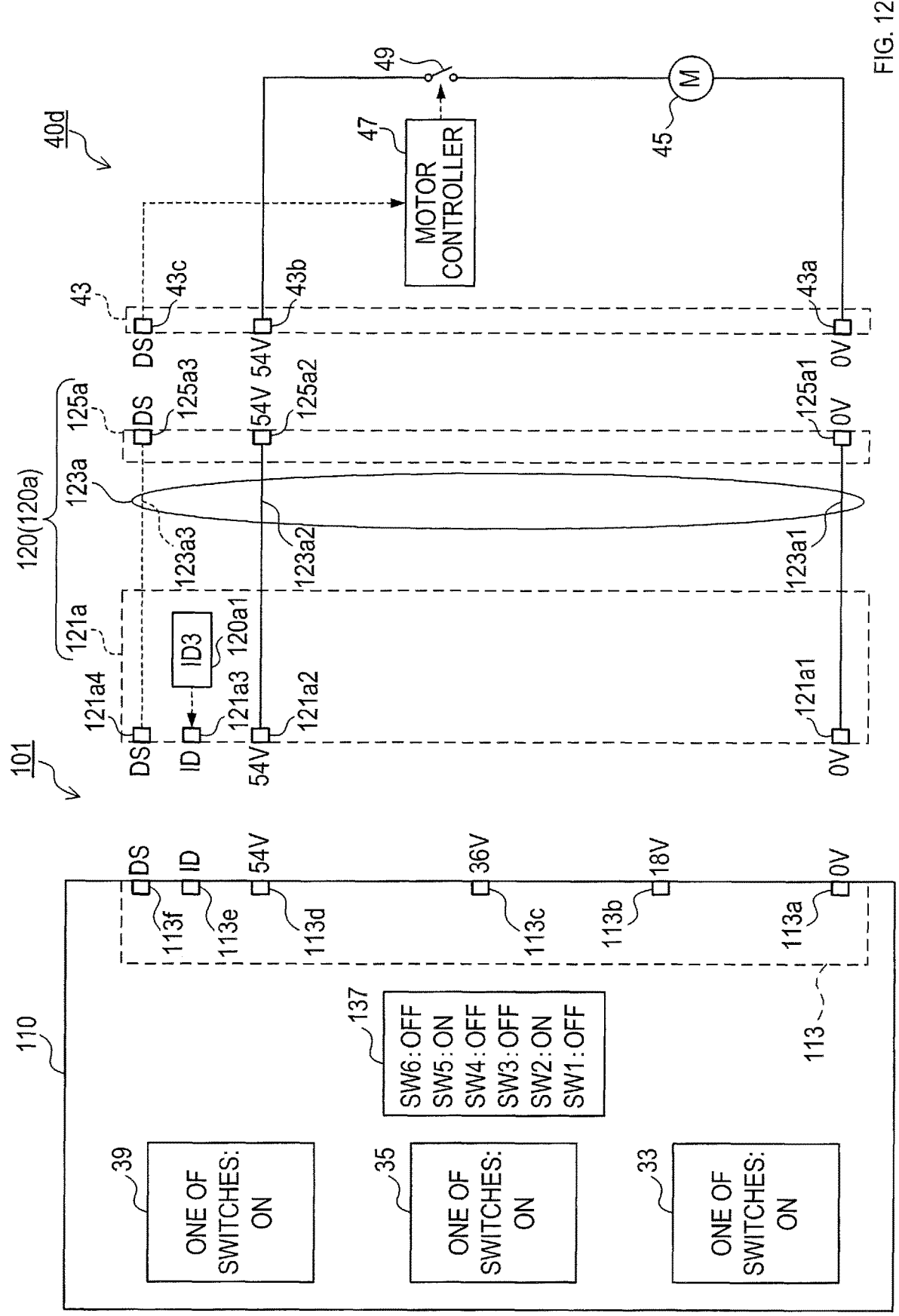
FIG. 12 is an explanatory view showing an electrical configuration of a second voltage supplier, a third voltage adapter, and a fourth electric device.
Figure 13:
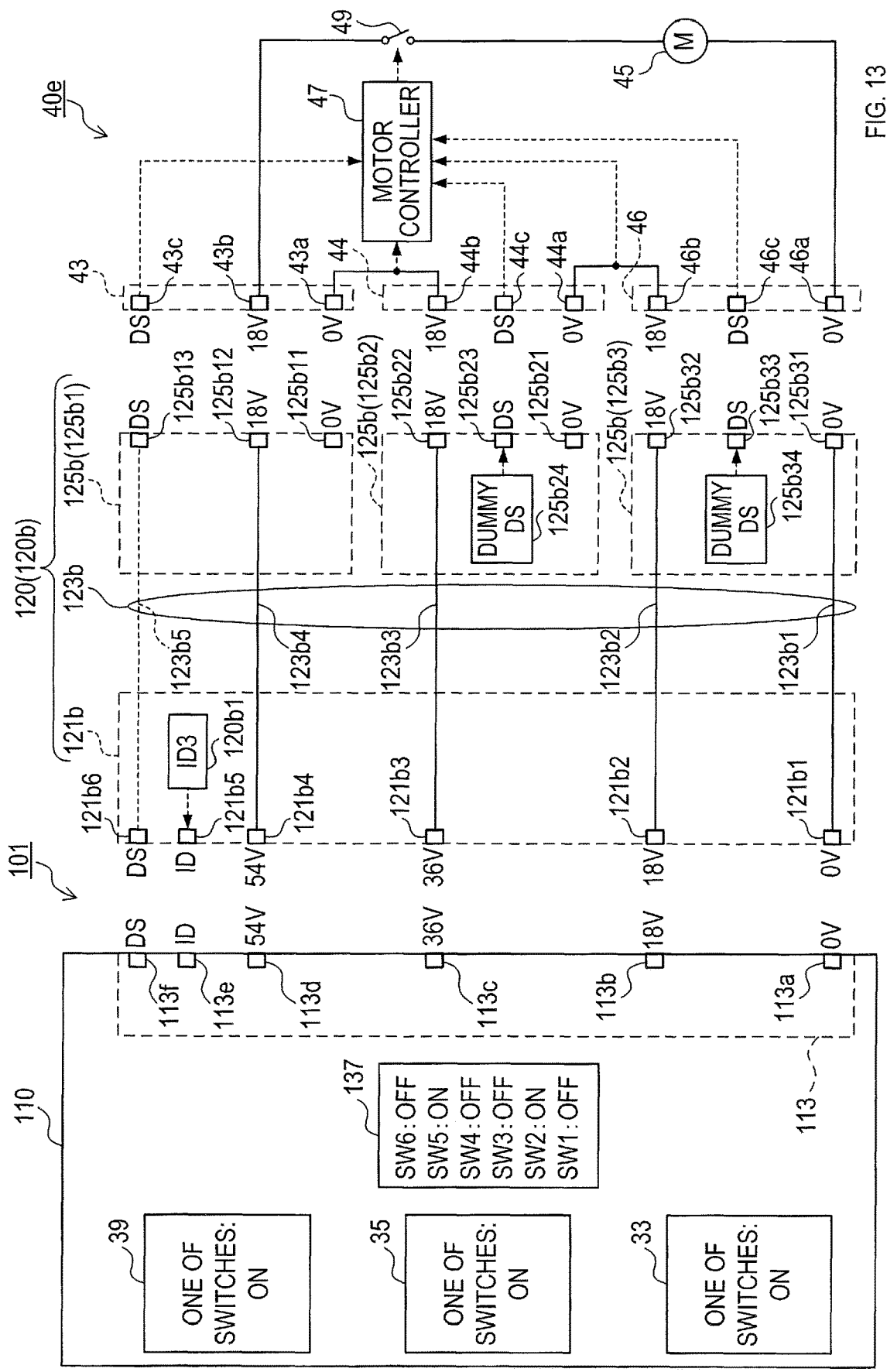
FIG. 13 is an explanatory view showing an electrical configuration of the second voltage supplier, the multiple-output adapter, and a fifth electric device.
Figure 14:
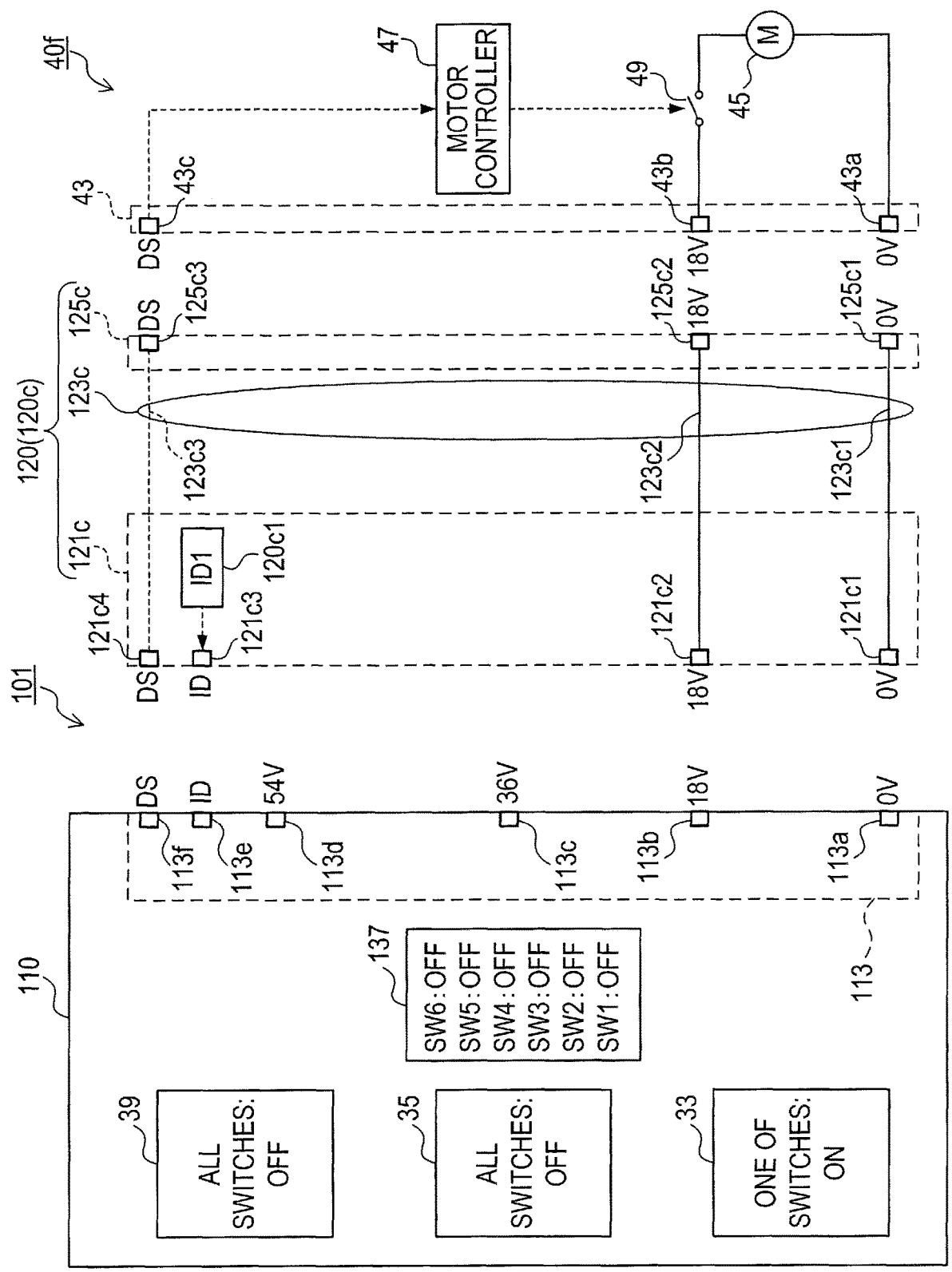
FIG. 14 is an explanatory view showing an electrical configuration of the second voltage supplier, the first voltage adapter, and a sixth electric device.

The second discharge adapter 120 is provided with two or more types of discharge adapters with different voltage output states for the electric device. As shown in FIGS. 12, 13 and 14, the second discharge adapter 120 includes a third voltage adapter 120*a*, a multiple-output adapter 120*b*, and a first voltage adapter 120*c*.

The third voltage adapter 120*a* is configured to output one system of 54 V voltage (tripled rated voltage of one battery pack) to the electric device. The multiple-output adapter 120*b* is configured to output three systems of 18 V voltage (rated voltage of one battery pack) to the electric device. The first voltage adapter 120*c* is configured to output one system of 18 V voltage (rated voltage of one battery pack) to the electric device.

[2-2-1. Third Voltage Adapter]

As shown in FIG. 12, the third voltage adapter 120*a* is provided with one 54 V voltage output system, and outputs one system of 54 V voltage to the electric device. The third voltage adapter 120*a* includes a third voltage connector 121*a*, a device connection cable 123*a*, and a device unit 125*a*. The device unit 125*a* is configured to be attached to/detached from the fourth electric device 40*d*.

The third voltage connector 121*a* includes a ground external terminal 121*a*1, a third external terminal 121*a*2, an identifier output terminal 121*a*3, and a permission signal acquisition terminal 121*a*4. The ground external terminal 121*a*1 is configured to be coupled to the ground output terminal 113*a*. The third external terminal 121*a*2 is configured to be coupled to the third positive electrode output terminal 113*d*. The identifier output terminal 121*a*3 is configured to be coupled to the identifier acquisition terminal 113*e*. The permission signal acquisition terminal 121*a*4 is configured to be coupled to the permission signal output terminal 113*f*.

The third voltage connector 121*a* includes an information storage 120*a*1. The information storage 120*a*1 is configured to be coupled to the identifier acquisition terminal 113*e* via the identifier output terminal 121*a*3. The information storage 120*a*1 stores the identifier information corresponding to the third voltage adapter 120*a*. The information storage 120*a*1 stores third identifier information ID3 as the identifier information corresponding to the third voltage adapter 120*a*. The third identifier information ID3 represents the voltage output state to output a 54 V voltage using the ground output terminal 113*a* and the third positive electrode output terminal 113*d*.

When the third identifier information ID3 of the information storage 120*a*1 is acquired from the third voltage connector 121*a*, the controller 31 controls the state of the second output voltage switch 137 based on the third identifier information ID3. The controller 31, for example, as shown in FIG. 12, controls the state of the second output voltage switch 137 so that the first switch SW1, the third switch SW3, the fourth switch SW4, and the sixth switch SW6 are in the interrupting state (OFF state) and the second switch SW2 and the fifth switch SW5 are in the conducting state (ON state). At the same time, the controller 31 sets the individual switches corresponding to the battery pack having the highest output voltage among the coupled battery packs in each of the first pack parallel coupler 33, the second pack parallel coupler 35, and the third pack parallel coupler 39 to the conducting state (ON state), and sets the individual switches corresponding to the other battery packs to the interrupting state (OFF state).

This allows the second power supplier 110 to output a 54 V voltage from the second output connector 113 using one of the battery pack 33*c*1 to 33*c*4 coupled to the first pack parallel coupler 33, one of the battery pack 35*c*1 to 35*c*4 coupled to the second pack parallel coupler 35, and one of the battery pack coupled to the third pack parallel coupler 39 (in other words, using three battery packs). FIG. 12 shows a schematic configuration of the second output connector 113 and a state of each switch in the second battery accommodating body 110*a* of the second power supplier 110. Other configurations are not shown.

The device connection cable 123*a* is electrically coupled to the third voltage connector 121*a*, and is indirectly coupled to the fourth electric device 40*d* via the device unit 125*a*. The device connection cable 123*a* includes a ground core 123*a*1 coupled to the ground external terminal 121*a*1, a third voltage core 123*a*2 coupled to the third external terminal 121*a*2, and a permission signal core 123*a*3 coupled to the permission signal acquisition terminal 121*a*4.

The device unit 125*a* is configured to be attached to/detached from the battery port 43 of the fourth electric device 40*d*. The device unit 125*a* includes a ground device terminal 125*a*1, a third device terminal 125*a*2, and a permission signal device terminal 125*a*3.

The ground core 123*a*1 electrically couples the ground external terminal 121*a*1 of the third voltage connector 121*a* and the ground device terminal 125*a*1 of the device unit 125*a*. The third voltage core 123*a*2 electrically couples the third external terminal 121*a*2 of the third voltage connector 121*a* and the third device terminal 125*a*2 of the device unit 125*a*. The permission signal core 123*a*3 electrically couples the permission signal acquisition terminal 121*a*4 of the third voltage connector 121*a* and the permission signal device terminal 125*a*3 of the device unit 125*a*.

The fourth electric device 40*d* is configured to be driven by receiving a 54 V voltage. The fourth electric device 40*d* includes the battery port 43, the motor 45, the motor controller 47, and the drive switch 49.

Since the battery port 43, the motor 45, the motor controller 47, and the drive switch 49 of the fourth electric device 40*d* have substantially the same configuration as the battery port 43, the motor 45, the motor controller 47, and the drive switch 49 of the first electric device 40*a* except that the drive voltage is different (54 V drive and not 18 V drive), detailed description thereof is not given.

[2-2-2. Multiple-Output Adapter]

As shown in FIG. 13, the multiple-output adapter 120*b* has three 18 V voltage output systems, and outputs three systems of 18 V voltage to the electric device. The multiple-output adapter 120*b* includes a multiple-output connector 121*b*, a device connection cable 123*b*, and a device unit 125*b*. The device unit 125*b* includes a first device unit 125*b*1, a second device unit 125*b*2, and a third device unit 125*b*3. The device unit 125*b* is configured to be attached to/detached from the fifth electric device 40*e*.

The multiple-output connector 121*b* includes a ground external terminal 121*b*1, a first external terminal 121*b*2, a second external terminal 121*b*3, a third external terminal 121*b*4, an identifier output terminal 121*b*5, and a permission signal acquisition terminal 121*b*6. The ground external terminal 121*b*1 is configured to be coupled to the ground output terminal 113*a*. The first external terminal 121*b*2 is configured to be coupled to the first positive electrode output terminal 113*b*. The second external terminal 121*b*3 is configured to be coupled to the second positive electrode output terminal 113*c*. The third external terminal 121*b*4 is configured to be coupled to the third positive electrode output terminal 113*d*. The identifier output terminal 121*b*5 is configured to be coupled to the identifier acquisition terminal 113*e*. The permission signal acquisition terminal 121*b*6 is configured to be coupled to the permission signal output terminal 113*f*.

The multiple-output connector 121*b* includes an information storage 120*b*1. The information storage 120*b*1 is configured to be coupled to the identifier acquisition terminal 113*e* via the identifier output terminal 121*b*5. The information storage 120*b*1 stores the identifier information corresponding to the multiple-output adapter 120*b*. The information storage 120*b*1 stores the third identifier information ID3 as the identifier information corresponding to the multiple-output adapter 120*b*. The third identifier information ID3 represents the voltage output state provided with three 18 V voltage output systems. In this voltage output state, specifically, the ground output terminal 113*a* and the first positive electrode output terminal 113*b* are used to output 18 V output voltage (first system), the first positive electrode output terminal 113*b* and the second positive electrode output terminal 113*c* are used to output 18 V output voltage (second system), and the second positive electrode output terminal 113*c* and the third positive electrode output terminal 113*d* are used to output 18 V output voltage (third system).

In the present embodiment, the identifier information ID stored in the information storage 120*b*1 of the multiple-output connector 121*b* and the identifier information ID stored in the information storage 120*a*1 of the third voltage connector 121*a* are the same third identifier information ID3. This is because the multiple-output adapter 120*b* and the third voltage adapter 120*a* have the same voltage output state when receiving electric power from the second power supplier 110. If the multiple-output adapter 120*b* and the third voltage adapter 120*a* have different voltage output states when receiving electric power from the second power supplier 110, it is preferable that each stores different identifier information in the information storage.

When the third identifier information ID3 of the information storage 120*b*1 is acquired from the multiple-output connector 121*b*, the controller 31 controls the state of the second output voltage switch 137 based on the third identifier information ID3. The controller 31, for example, as shown in FIG. 13, controls the state of the second output voltage switch 137 so that the first switch SW1, the third switch SW3, the fourth switch SW4, and the sixth switch SW6 are in the interrupting state (OFF state) and the second switch SW2 and the fifth switch SW5 are in the conducting state (ON state). At the same time, the controller 31 sets the individual switches corresponding to the battery pack having the highest output voltage among the coupled battery packs in each of the first pack parallel coupler 33, the second pack parallel coupler 35, and the third pack parallel coupler 39 to the conducting state (ON state), and sets the individual switches corresponding to the other battery packs to the interrupting state (OFF state).

This allows the second power supplier 110 to output three systems of 18 V voltage from the second output connector 113 using one of the battery packs 33*c*1 to 33*c*4 coupled to the first pack parallel coupler 33, one of the battery packs 35*c*1 to 35*c*4 coupled to the second pack parallel coupler 35, and one of the battery packs coupled to the third pack parallel coupler 39 (in other words, using three battery packs). FIG. 13 shows a schematic configuration of the second output connector 113 and a state of each switch in the second battery accommodating body 110*a* of the second power supplier 110. Other configurations are not shown.

The device connection cable 123*b* is electrically coupled to the multiple-output connector 121*b*, and is indirectly coupled to the fifth electric device 40*e* via the device unit 125*b* (first device unit 125*b*1, second device unit 125*b*2, or third device unit 125*b*3). The device connection cable 123*b* is provided between the multiple-output connector 121*b* and the first device unit 125*b*1, between the multiple-output connector 121*b* and the second device unit 125*b*2, and between the multiple-output connector 121*b* and the third device unit 125*b*3. The device connection cable 123*b* includes a ground core 123*b*1 coupled to the ground external terminal 121*b*1, a first external core 123*b*2 coupled to the first external terminal 121*b*2, a second external core 123*b*3 coupled to the second external terminal 121*b*3, a third external core 123*b*4 coupled to the third external terminal 121*b*4, and a permission signal core 123*b*5 coupled to the permission signal acquisition terminal 121*b*6.

The first device unit 125*b*1, the second device unit 125*b*2, and the third device unit 125*b*3 are respectively configured to be attached to/detached from the first battery port 43, the second battery port 44, and a third battery port 46 of the fifth electric device 40*e*. The first device unit 125*b*1 includes a ground device terminal 125*b*11, a first device terminal 125*b*12, and a permission signal device terminal 125*b*13. The second device unit 125*b*2 includes a ground device terminal 125*b*21, a first device terminal 125*b*22, and a permission signal device terminal 125*b*23. The third device unit 125*b*3 includes a ground device terminal 125*b*31, a first device terminal 125*b*32, and a permission signal device terminal 125*b*33.

The ground core 123*b*1 electrically couples the ground external terminal 121*b*1 of the multiple-output connector 121*b* and the ground device terminal 125*b*31 of the third device unit 125*b*3. The first external core 123*b*2 electrically couples the first external terminal 121*b*2 of the multiple-output connector 121*b* and the first device terminal 125*b*32 of the third device unit 125*b*3. The second external core 123*b*3 electrically couples the second external terminal 121*b*3 of the multiple-output connector 121*b* and the first device terminal 125*b*22 of the second device unit 125*b*2. The third external core 123*b*4 electrically couples the third external terminal 121*b*4 of the multiple-output connector 121*b* and the first device terminal 125*b*12 of the first device unit 125*b*1. The permission signal core 123*b*5 electrically couples the permission signal acquisition terminal 121*b*6 of the multiple-output connector 121*b* and the permission signal device terminal 125*b*13 of the first device unit 125*b*1.

The first external core 123*b*2 and the second external core 123*b*3 of the device connection cable 123*b* coupled to the multiple-output connector 121*b* are thinner (have a smaller diameter) than the ground core 123*b*1 and the third external core 123*b*4 of the device connection cable 123*b*.

Also, neither the ground device terminal 125*b*11 of the first device unit 125*b*1 nor the ground device terminal 125b21 of the second device unit 125b2 is coupled to any core of the device connection cable 123b. Further, the second device unit 125b2 and the third device unit 125b3 respectively include a dummy permission signal storage 125b24 and a dummy permission signal storage 125b34. The dummy permission signal storage 125b24 is coupled to the permission signal device terminal 125b23, and outputs a dummy permission signal DS to the fifth electric device 40e via the permission signal device terminal 125b23. The dummy permission signal storage 125b34 is coupled to the permission signal device terminal 125b33 and outputs the dummy permission signal DS to output a discharge permission signal to the fifth electric device 40e via the permission signal device terminal 125b33 at all time.

The fifth electric device 40e is configured to be driven by receiving three systems of 18 V voltage. The fifth electric device 40e includes the first battery port 43, the second battery port 44, the third battery port 46, the motor 45, the motor controller 47, and the drive switch 49.

The fifth electric device 40e is different from the second electric device 40b in that the third battery port 46 is at least provided. However, the two are common in that the both includes the first battery port 43, the second battery port 44, the motor 45, the motor controller 47, and the drive switch 49, and have substantially the same configuration. Therefore, detailed description thereof is not given.

The third battery port 46 includes a ground terminal 46a, a first device voltage terminal 46b, and a permission signal reception terminal 46c. The ground terminal 46a is configured to be coupled to the ground device terminal 125b31. The first device voltage terminal 46b is configured to be coupled to the first device terminal 125b32. The permission signal reception terminal 46c is configured to be coupled to the permission signal device terminal 125b33.

[2-2-3. First Voltage Adapter]

As shown in FIG. 14, the first voltage adapter 120c is provided with one 18 V voltage output system, and outputs one system of 18 V voltage to the electric device. The first voltage adapter 120c includes a first voltage connector 121c, a device connection cable 123c, and a device unit 125c. The device unit 125c is configured to be attached to/detached from the sixth electric device 40f.

The first voltage connector 121c includes a ground external terminal 121c1, a first external terminal 121c2, an identifier output terminal 121c3, and a permission signal acquisition terminal 121c4. The ground external terminal 121c1 is configured to be coupled to the ground output terminal 113a. The first external terminal 121c2 is configured to be coupled to the first positive electrode output terminal 113b. The identifier output terminal 121c3 is configured to be coupled to the identifier acquisition terminal 113e. The permission signal acquisition terminal 121c4 is configured to be coupled to the permission signal output terminal 113f.

The first voltage connector 121c includes an information storage 120c1. The information storage 120c1 is configured to be coupled to the identifier acquisition terminal 113e via the identifier output terminal 121c3. The information storage 120c1 stores the identifier information corresponding to the first voltage adapter 120c. The identifier information represents the voltage output state to be outputted from the second output connector 113. The information storage 120c1 stores the first identifier information ID1 as the identifier information corresponding to the first voltage adapter 120c. The first identifier information ID1 represents the voltage output state to output an 18 V voltage using the ground output terminal 113a and the first positive electrode output terminal 113b.

When the first identifier information ID1 of the information storage 120c1 is acquired from the first voltage connector 121c, the controller 31 controls the state of the second output voltage switch 137 based on the first identifier information ID1. The controller 31, for example, as shown in FIG. 14, controls the state of the second output voltage switch 137 so that all of the first switch SW1 to the sixth switch SW6 are in the interrupting state (OFF state). At the same time, the controller 31 sets the individual switch (one of the individual switch 33b1 to 33b4) corresponding to the battery pack having the highest output voltage among the battery packs 33c1 to 33c4 coupled to the first pack parallel coupler 33 to the conducting state (ON state), and sets the individual switches corresponding to the other battery packs to the interrupting state (OFF state). Further, the controller 31 sets all the individual switches of each of the second pack parallel coupler 35 and the third pack parallel coupler 39 to the interrupting state (OFF state).

This allows the second power supplier 110 to output an 18 V voltage from the second output connector 113 using the battery packs 33c1 to 33c4 coupled to the first pack parallel coupler 33. FIG. 14 shows a schematic configuration of the second output connector 113 and a state of each switch in the second battery accommodating body 110a of the second power supplier 110. Other configurations are not shown.

The device connection cable 123c is electrically coupled to the first voltage connector 121c and is indirectly coupled to the sixth electric device 40f via the device unit 125c. The device connection cable 123c includes a ground core 123c1 coupled to the ground external terminal 121c1, a first voltage core 123c2 coupled to the first external terminal 121c2, and a permission signal core 123c3 coupled to the permission signal acquisition terminal 121c4.

The device unit 125c is configured to be attached to/detached from the battery port 43 of the sixth electric device 40f. The device unit 125c includes a ground device terminal 125c1, a first device terminal 125c2, and a permission signal device terminal 125c3.

The ground core 123c1 electrically couples the ground external terminal 121c1 of the first voltage connector 121c and the ground device terminal 125c1 of the device unit 125c. The first voltage core 123c2 electrically couples the first external terminal 121c2 of the first voltage connector 121c and the first device terminal 125c2 of the device unit 125c. The permission signal core 123c3 electrically couples the permission signal acquisition terminal 121c4 of the first voltage connector 121c and the permission signal device terminal 125c3 of the device unit 125c.

The sixth electric device 40f is configured to be driven by receiving 18 V voltage. The sixth electric device 40f includes the battery port 43, the motor 45, the motor controller 47, and the drive switch 49. The sixth electric device 40f has the same configuration as the first electric device 40a, and thus detailed description thereof is not given.

The second power supplier 110 may control the second output voltage switch 137 to output the voltage using the battery pack coupled to the second pack parallel coupler 35 or the battery pack coupled to the third pack parallel coupler 39, when the first voltage adapter 120c is coupled and all the battery packs coupled to the first pack parallel coupler 33 cannot output the voltage.

[2-3. Output Voltage Control]

In the second power supplier 110, similarly to the power supplier 10 of the first embodiment, the controller 31 executes various control processes such as the output voltage control process.

The output voltage control process to be executed by the controller 31 of the second power supplier 110 is different from that of the first embodiment in detail, but is common in that the identifier information ID is acquired from the second discharge adapter 120 coupled to the second output connector 113 and the voltage is outputted from the second output connector 113 in the voltage output state corresponding to the identifier information ID. Thus, description of the output voltage control process of the second embodiment is not given here.

The second power supplier 110 executes the output voltage control process to identify the type of the coupled second discharge adapter 120 (third voltage adapter 120a, multiple-output adapter 120b, or first voltage adapter 120c) and output a voltage from the second output connector 113 in the voltage output state corresponding to the type of the second discharge adapter 120.

[2-4. Effect]

As described above, the second power supplier 110 provided in the second power supply system 101 includes the three pack parallel couplers 33, 35, 39, and is configured to be able to output a tripled output voltage (54 V) of the battery pack and three systems of the rated voltage (18 V) of the battery pack.

The second power supplier 110, when outputting a voltage from the output connector 13 using the battery packs coupled to the pack couplers (six or more pack couplers), classifies the battery packs into three groups in accordance of the three pack parallel couplers 33, 35, 39. After classifying the battery packs into the three groups, the second power supplier 110 is configured to switch the coupling state between the second pack parallel coupler 35 and the second output connector 113 (ground output terminal 113a, first positive electrode output terminal 113b, or second positive electrode output terminal 113c), and the coupling state between the third pack parallel coupler 39 and the second output connector 113 (ground output terminal 113a, first positive electrode output terminal 113b, second positive electrode output terminal 113c, or third positive electrode output terminal 113d), while fixing the coupling state between the first pack parallel coupler 33 and the second output connector 113 (ground output terminal 113a or first positive electrode output terminal 113b).

The configuration as above can reduce the patterns of the coupling state, as compared to the configuration in which the coupling state between the battery packs (six or more battery packs) and the outputter (second output connector) is switched to various patterns. Therefore, the second output voltage switch 137 can be simplified. This allows the second power supplier 110 to reduce cost increase of the second output voltage switch 137.

The controller 31 determines the voltage output state to output from the second output connector 113, and controls the second output voltage switch 137 based on the result of determination. This allows switching of voltage output states and achievement of the voltage output state suitable for application.

According to the second power supplier 110, device configuration can be simplified and cost increase can be suppressed upon switching the voltage output states.

3. Other Embodiments

The embodiments of present disclosure have been described in the above. However, the present disclosure is not limited to the aforementioned embodiments and can be practiced in various forms without departing from the gist of the present disclosure.

(3a) In the aforementioned embodiments, one pack parallel coupler is provided with four pack couplers (in other words, four battery packs). The pack parallel coupler may be provided with two, three, five, or more pack couplers.

Also, in the aforementioned embodiments, each of the pack parallel couplers has the same number of pack couplers. Each of the pack parallel couplers may have a different number of pack couplers.

(3b) The rated output voltage of the battery pack attached to the power supplier of the present disclosure is not limited to 18 V. A battery pack having the rated output voltage other than 18 V may be attached.

(3c) The external device connectors coupled to the outputter (output connector) may not be indirectly coupled to the electric device via the device unit, and may be directly coupled to the electric device.

(3d) The electric device may be, for example, an electric hammer, electric hammer drill, electric drill, electric driver, electric wrench, electric reciprocating saw, electric jig saw, electric cutter, electric chain saw, electric planer, electric tacker, electric nail gun, electric hedge trimmer, electric lawn mower, electric grass trimmer, electric weed whacker, electric cleaner, electric blower, grinder and the like.

(3e) In the power supplier of the present disclosure, each of the ground output terminal, the first positive electrode output terminal, and the second positive electrode output terminal may have a predefined range of potential when outputting a voltage from the outputter.

Setting the potential of each terminal in the outputter within the predefined range can suppress application of inappropriate voltage to the electric device coupled to the outputter. In other words, when the potential of each terminal can be changed without limitation and when there is a setting error of the output voltage value, the electric device may be damaged due to application of inappropriate voltage (for example, excessive voltage) to the electric device coupled to the outputter. In contrast, this power supplier can suppress inappropriate voltage application to the electric device coupled to the outputter. Thus, damage to the electric device can be reduced.

(3f) The power supplier of the present disclosure may include a battery accommodating body that accommodates the first pack parallel coupler and the second pack parallel coupler, and an output extension cable that couples the outputter and the battery accommodating body.

As above, coupling the outputter to the battery accommodating body via the output extension cable allows the position of the outputter to change relative to the battery accommodating body and allows only the output connector to move. Therefore, various use environments are available.

Also, the power supplier of the present disclosure may include a battery accommodating body that accommodates the first pack parallel coupler and the second pack parallel coupler, and the outputter (output connector) may be integrally provided with the battery accommodating body.

In other words, the power supplier may not include an output extension cable as in the aforementioned embodiment, and may be, for example, provided with the outputter (output connector) and the battery accommodating body integrally. Integrally provided battery accommodating body and the outputter simplifies the configuration as compared to separately provided battery accommodating body and outputter. This results in cost reduction.

(3g) In the aforementioned second embodiment, the output voltage is 18 V and 54 V. One 36 V system may be outputted. Also, plural systems to output the voltage is not limited to three 18 V systems. For example, one system of 18 V and one 36 V system may be outputted at the same time.

(3h) A function of one component in the aforementioned embodiments may be divided into two or more components. A function of two or more components may be integrated into one component. Also, a part of the configuration of the embodiments may be replaced with a known configuration having the same function. Further, a part of the configuration of the embodiments may be omitted. At least a part of the configuration of the embodiment may be added to or replaced with the configuration of the other embodiments. It should be noted that any and all modes that are encompassed in the technical ideas defined by the languages in the scope of the claims are embodiments of the present disclosure.

What is claimed is:

1. A power supplier comprising:
   an outputter including at least a ground output terminal, a first positive electrode output terminal, and a second positive electrode output terminal;
   a first pack parallel coupler including first pack couplers, the first pack couplers being configured to be coupled to first battery packs, each of the first battery packs including a first positive electrode terminal and a first negative electrode terminal, and the first pack parallel coupler being configured (i) to couple the first positive electrode terminal of each of the first battery packs to the first positive electrode output terminal, and (ii) to couple the first negative electrode terminal of each of the first battery packs to the ground output terminal;
   a second pack parallel coupler including second pack couplers, the second pack couplers being configured to be coupled to second battery packs, each of the second battery packs including a second positive electrode terminal and a second negative electrode terminal, and the second pack parallel coupler being configured to couple the second battery packs in parallel with each other;
   an output voltage switch configured to switch an electrical coupling state between the second pack parallel coupler and the outputter, the output voltage switch being configured to switch a coupling state of the second positive electrode terminal of one of the second battery packs to either of (i) a state in which the second positive electrode terminal of the one of the second battery packs is coupled only to the second positive electrode output terminal, or (ii) a state in which the second positive electrode terminal of the one of the second battery packs is coupled to at least the first positive electrode output terminal, and the output voltage switch being configured to switch a coupling state of the second negative electrode terminal of each of the second battery packs to either of (i) a state in which the second negative electrode terminal of each of the second battery packs is coupled to the first positive electrode output terminal, or (ii) a state in which the second negative electrode terminal of each of the second battery packs is coupled to the ground output terminal; and
   a controller configured to determine an output mode of the outputter, the output mode corresponding to a magnitude of voltage to be outputted from the outputter, and the controller being further configured to control the output voltage switch based on a result of determination by the controller.

2. The power supplier according to claim 1,
   wherein the first pack parallel coupler includes first individual switches, each of the first individual switches being coupled to a corresponding one of the first pack couplers in series,
   wherein the second pack parallel coupler includes second individual switches, each of the second individual switches being coupled to a corresponding one of the second pack couplers in series, and
   wherein the controller is configured to control the first individual switches, the second individual switches, and the output voltage switch so that one battery pack out of the first and second battery packs is coupled between the ground output terminal and the first positive electrode output terminal.

3. The power supplier according to claim 2,
   wherein the controller is configured to control the first individual switches to output a voltage from one battery pack having the highest voltage among the first battery packs.

4. The power supplier according to claim 2,
   wherein the controller is configured to control the second individual switches to output a voltage from one battery pack having the highest voltage among the second battery packs.

5. The power supplier according to claim 1,
   wherein the first pack parallel coupler includes first individual switches, each of the first individual switches being coupled to a corresponding one of the first pack couplers,
   wherein the second pack parallel coupler includes second individual switches, each of the second individual switches being coupled to a corresponding one of the second pack couplers, and
   wherein the controller is configured to control the first individual switches, the second individual switches, and the output voltage switch so that two battery packs out of the first and second battery packs are coupled in series between the ground output terminal and the second positive electrode output terminal.

6. The power supplier according to claim 5,
   wherein the controller is configured to control the first individual switches to output a voltage from one battery pack having the highest voltage among the first battery packs.

7. The power supplier according to claim 5,
   wherein the controller is configured to control the second individual switches to output a voltage from one battery pack having the highest voltage among the second battery packs.

8. The power supplier according to claim 1,
   wherein the controller is configured to acquire identifier information, and
   wherein the controller is further configured to determine the output mode based on the identifier information.

9. The power supplier according to claim 8,
   wherein the controller is configured to control the output voltage switch to couple one battery pack out of the first and second battery packs between the ground output terminal and the first positive electrode output terminal in response to acquisition of a first identifier as the identifier information.

10. The power supplier according to claim 9,
wherein the controller is configured to control the output voltage switch to couple two battery packs out of the first and second battery packs between the ground output terminal and the second positive electrode output terminal in response to acquisition of a second identifier as the identifier information.

11. The power supplier according to claim 8,
wherein the controller is further configured to control the output voltage switch to stop outputting the voltage from the outputter in response to non-acquisition of the identifier information by the controller.

12. The power supplier according to claim 8,
wherein the first battery packs and the second battery packs are configured to output state notification signals, each of the state notification signals representing a state of a corresponding one of the first battery packs and the second battery packs,
wherein the controller is configured to determine whether it is possible for the first pack parallel coupler and/or the second pack parallel coupler to output a voltage based on the state notification signals in response to acquisition of a first identifier as the identifier information, and
wherein the controller is further configured to output a discharge permission signal to an electric device coupled to the outputter in response to determination that it is possible for the first pack parallel coupler and/or the second pack parallel coupler to output the voltage.

13. The power supplier according to claim 8,
wherein the first battery packs and the second battery packs are configured to output state notification signals, each of the state notification signals representing a state of a corresponding one of the first battery packs and the second battery packs,
wherein the controller is configured to determine whether it is possible for both the first pack parallel coupler and the second pack parallel coupler to output a voltage based on the state notification signals in response to acquisition of a second identifier as the identifier information, and
wherein the controller is further configured to output a discharge permission signal to an electric device coupled to the outputter in response to determination that it is possible for both the first pack parallel coupler and the second pack parallel coupler to output the voltage.

14. The power supplier according to claim 8,
wherein the controller is configured (i) to output a discharge permission signal to an electric device coupled to the outputter in response to the controller determining the output mode based on the identifier information, and (ii) to stop outputting the discharge permission signal in response to the controller being unable to determine the output mode based on the identifier information.

15. The power supplier according to claim 8,
wherein the battery packs are configured to output state notification signals, each of the state notification signals representing a state of a corresponding one of the battery packs, and
wherein the controller is configured (i) to output a discharge permission signal to an electric device coupled to the outputter in response to the controller determining that both the first pack parallel coupler and the second pack parallel coupler are able to output a voltage based on the state notification signals, (ii) to stop outputting the discharge permission signal in response to the controller determining that both the first pack parallel coupler and the second pack parallel coupler are unable to output a voltage based on the state notification signals.

16. The power supplier according to claim 1,
wherein the first pack couplers include three or more pack couplers.

17. The power supplier according to claim 16,
wherein the second pack couplers include three or more pack couplers.

18. The power supplier according to claim 1,
wherein the first battery packs and the second battery packs are configured to output state notification signals, each of the state notification signals representing a state of a corresponding one of the first battery packs and the second battery packs,
wherein the controller is configured to determine whether it is possible for the first pack parallel coupler and the second pack parallel coupler to output a voltage based on the state notification signals outputted from the first battery packs and the second battery packs, and
wherein the controller is further configured to control transmission of a discharge permission signal to an electric device coupled to the outputter based on the result of determination.

19. The power supplier according to claim 1, comprising:
a battery accommodating body accommodating the first pack parallel coupler and the second pack parallel coupler therein;
an output extension cable coupling or configured to couple the outputter to the battery accommodating body;
at least one external device connector configured to be attached to/detached from the outputter; and
a device connection cable including a first end electrically coupled to the at least one external device connector, and a second end directly or indirectly coupled to an electric device.

20. The power supplier according to claim 19,
wherein the at least one external device connector includes external device connectors, each of the external device connectors having a configuration different from each other depending on the output mode.

21. The power supplier according to claim 19,
wherein the at least one external device connector includes a first voltage connector provided with a ground external terminal configured to be coupled to the ground output terminal and a first external terminal configured to be coupled to the first positive electrode output terminal.

22. The power supplier according to claim 21,
wherein the device connection cable includes a ground core coupled to the ground external terminal and a first voltage core coupled to the first external terminal.

23. The power supplier according to claim 19,
wherein the at least one external device connector includes a multiple-output connector provided with a ground external terminal configured to be coupled to the ground output terminal, a first external terminal configured to be coupled to the first positive electrode output terminal, and a second external terminal configured to be coupled to the second positive electrode output terminal.

24. The power supplier according to claim 23,
wherein the device connection cable includes a ground core coupled to the ground external terminal, a first external core coupled to the first external terminal, and a second external core coupled to the second external terminal, and
wherein the first external core is thinner than the ground core and the second external core of the multiple-output connector.

25. The power supplier according to claim 19,
wherein the at least one external device connector includes a second voltage connector provided with a ground external terminal configured to be coupled to the ground output terminal, and a second external terminal configured to be coupled to the first positive electrode output terminal or the second positive electrode output terminal.

26. The power supplier according to claim 25,
wherein the device connection cable includes a ground core coupled to the ground external terminal and a second voltage core coupled to the second external terminal.

27. The power supplier according to claim 19,
wherein the outputter includes:
an identifier acquisition terminal configured to acquire identifier information; and
a permission signal output terminal configured to output a discharge permission signal,
wherein the at least one external device connector includes:
an identifier output terminal configured to be coupled to the identifier acquisition terminal; and
a permission signal acquisition terminal configured to be coupled to the permission signal output terminal.

28. The power supplier according to claim 27,
wherein the at least one external device connector includes an information storage to store the identifier information.

* * * * *